US007606428B2

(12) United States Patent
Jang et al.

(10) Patent No.: US 7,606,428 B2
(45) Date of Patent: Oct. 20, 2009

(54) SCHEMA AND STYLE SHEET FOR DIBR DATA

(75) Inventors: Gyeongja Jang, Gyeonggi-do (KR);
Mahnjin Han, Gyeonggi-do (KR);
Dokyoon Kim, Gyeonggi-do (KR);
Shinjun Lee, Seoul (KR)

(73) Assignee: Samsung Electronics Co., Ltd., Suwon-Si, Gyeonggi-Do (KR)

( * ) Notice: Subject to any disclaimer, the term of this patent is extended or adjusted under 35 U.S.C. 154(b) by 923 days.

(21) Appl. No.: 11/073,690

(22) Filed: Mar. 8, 2005

(65) Prior Publication Data
US 2005/0201623 A1 Sep. 15, 2005

Related U.S. Application Data

(60) Provisional application No. 60/550,734, filed on Mar. 8, 2004, provisional application No. 60/585,567, filed on Jul. 7, 2004, provisional application No. 60/605,519, filed on Aug. 31, 2004.

(30) Foreign Application Priority Data
Mar. 4, 2005 (KR) ...................... 10-2005-0018333

(51) Int. Cl.
*G06K 9/36* (2006.01)
(52) U.S. Cl. .................. 382/232; 382/312; 382/313
(58) Field of Classification Search ............... 382/232, 382/312, 313; 345/418; 375/E7.021, E7.005, 375/E7.084, 240.01, 240.18; 707/102, 100, 707/101, 104.1; 715/205, 236
See application file for complete search history.

(56) References Cited

U.S. PATENT DOCUMENTS 7,203,692 B2 * 4/2007 Tabatabai et al. .......... 707/102
7,411,590 B1 8/2008 Boyd et al.
2003/0218606 A1 11/2003 Zhirkov et al.

FOREIGN PATENT DOCUMENTS

EP 1 435 738 A1 7/2004

OTHER PUBLICATIONS

European Search Report issued in corresponding European Patent Application No. 05 25 1373; Oct. 10, 2007; European Patent Office, The Hague, The Netherlands.
Jang, Gyeong-Ja, et al., "The XMT-A specifications for BitWrapper node and its encoding parameters," ISO/IEC JTC1/SC29/WG11, Dec. 2003, Hawaii, USA, 26 pp., ISO/IEC, Geneva, CH.
Han, Mahnjin, Editor, "ISO/IEC 14496- 11/PDAM4 (XMT & MPEG-J Extensions)," ISO/IEC JTC1/SC29/WG11 N6210, Dec. 2003, Jan. 7, 2004,pp. i-iv and 1-34, ISO/IEC, Geneva, CH.
Bourges-Sévenier (Mindego), Mikaël—editor, "FDIS of ISO/IEC 14496 Part 16: Animation Framework eXtension (AFX)," ISO/IEC JTC1/SC29/WG11 N5397, Dec. 2002, Awaji, Jan. 20, 2003, pp. i-vii and 1-182, ISO/IEC, Geneva, CH.

* cited by examiner

*Primary Examiner*—Anh Hong Do
(74) *Attorney, Agent, or Firm*—Buchanan Ingersoll & Rooney PC

(57) ABSTRACT

A schema and style sheets for DIBR data are provided. The schema includes: a BitWrapper node schema used for graphics data compression; and a DepthImage node schema, which is used for depthimage-based model rendering, includes camera information and texture information having a depth information, defines diTexture as an element including SFDepthtextureNode as a model group, wherein the BitWrapper node schema includes: a node element, which contains graphics data including data to be compressed and refers to SFWorldNode as a subelement; a BitWrapperEncodingParameter element; and three attributes having the names type, url, and buffer and the types SFInt32, MFUrl, and SFString, respectively. The schema and style sheets allow an author to easily control the representation and compression of DIBR when authoring 3D contents and to easily generate an input file for an MPEG-4 encoder.

45 Claims, 3 Drawing Sheets

SCHEMA AND STYLE SHEET FOR DIBR DATA

CROSS-REFERENCE TO RELATED PATENT APPLICATIONS

Priority is claimed to U.S. Provisional Patent Application No. 60/550,734, filed on Mar. 8, 2004, and No. 60/585,567, filed on Jul. 7, 2004, No. 60/605,519, filed on Aug. 31, 2004, in the U.S. Patent and Trademark Office, and the benefit of Korean Patent Application No. 10-2005-0018333, filed on Mar. 4, 2005, in the Korean Intellectual Property Office, the disclosures of which are incorporated herein in their entirety by reference.

BACKGROUND OF THE INVENTION

1. Field of the Invention

The present invention relates to an extensible MPEG-4 textual format (XMT) schema and a style sheet, and more particularly, to a schema for depth image-based representation (DIBR) data and a style sheet use to create an input file by parsing an input XMT file including DIBR data using the schema.

2. Description of the Related Art 3D contents in XMT format can be visualized using various multimedia, for example, a MPEG-4 player, a VRML player, an SMIL player, etc. 3D contents can be created in XMT format using schemas and style sheets. In particular, the present invention relates to an XMT schema and a style sheet for DIBR data.

Standardization of easy contents authoring methods has been propelled by the MPEG4 standardization Group. An easy method of controlling various factors involved in the representation, process, and compression of 3D data is required when authoring 3D contents. To this end, a mechanism of representing, processing, and compressing 3D data by meta representation (XMEG-4 SMT) is required. In particular, a method that allows an author to easily represent, process, and compress depth image-based representation (DIBR) data is required.

SUMMARY OF THE INVENTION

The present invention provides a schema for depth image-based representation (DIBR) data.

The present invention provides style sheets for DIBR data.

According to an aspect of the present invention, there is provided an XMT (extensible MPEG4 textual format) schema for DIBR data comprising: a BitWrapper node schema used for graphics data compression; and a DepthImage node schema, which is used for depthimage-based model rendering, includes camera information and texture information having a depth information, defines diTexture as an element including SFDepthTextureNode as a model group, wherein the BitWrapper node schema comprises: a node element, which contains graphics data including data to be compressed and refers to SFWorldNode as a subelement; a BitWrapperEncodingParameter element; and three attributes having the names type, url, and buffer and the types SFInt32, MFUrl, and SFString, respectively, and the camera information of the depthimage node schema defines at least one of position, orientation, fieldOfView, nearplane, farplane, and orthographic as an attribute name, and attribute types defined in the camera information include SFVec3f, SFRotation, SFVec2f, SFFloat, SFFloat, and SFBool, respectively.

The diTexture element in the depthimage node schema may define an SFDepthTextureNode node schema including PointTexture and SimpleTexture as elements. A node schema for the SimpleTexture may receive the depth image and a color image used for 3-dimensional rendering of a DIBR model, include a depth element including depth information as an image and a texture element including color information as an image, wherein the two images are defined in an SFTextualNodeType element.

A node schema for the PointTexture may define at least one of width, height, depthNbBits, depth, and color as an attribute name, and attribute types defined in the node schema may include SFInt32, SFInt32, SFInt32, MFInt32, and MFColor.

The XMT schema for DIBR data may further comprise an octreeimage node schema, which defines at least one of octree, octreeResolution, and voxelImageIndex as an attribute name and defines images as an element including SFDepthImageNode Type as a node group, wherein attribute types defined in the octreeimage node schema include SFInt32, MFInt32, and MFInt32, respectively.

The XMT schema for DIBR data may further comprise decoding information schema including an AFXConfig schema and a DecoderConfigDescriptor schema when the BitWrapper node schema is an out-band using a url field, wherein the DecoderConfigDescriptor schema defines an element name as AFXconfig in a decSpecificinfo node in a DecoderConfigDescriptor node including information required for decoding, and the AFXConfig schema defines OctreeImageDecoderSpecific information related to use of an octree image decoder for decoding and PointTextureCompDecoderSpecific information related to use of a point texture decoder for decoding as element names.

The XMT schema may further comprise a compression parameter schema including a compression rate for point texture, wherein the compression parameter schema is included in a node including BitWrapperEncodingParameter as an element name, includes PointTextureEncodingParameter as an element name, configPercent as an attribute name, and codingPercentType as an attribute type, wherein the codingPercentType has SimpleType as a type and codingPercentType as a name.

The codingPercentType may have int(integer) as a restriction base. The decoding information schema may further comprise BitWrapperEncodingHints used to define information required for Muxinfo in a script file (mux file), wherein the BitWrapperEncodingHints includes BitWrapperOctreeImageEncodingHints and BitWrapperPointTextureEncodingHints as subelements, and each of the subelements includes at least one of sourceFormat and targetFormat as a subelement.

The information required for the Muxinfo in the script file (mux file) may include a file name and a compression format of a compressed DIBR bitstream.

The XMT schema may further comprise a CompressedImageFormat schema, wherein, when a DIBR-related node includes a compressed image or a moving picture in the format of JPEG, PNG, MPEG4-Video, or VTC, the CompressedImageFormat schema provides decoding information, which includes a file name and a compression formation of a compressed bitstream, required for decoding of compressed information, and the CompressedImageFormat schema includes CompressedImageFormat as an element name and JPEG, PNG, MPEG4-Video, and VTC as subelement names, wherein each of the subelement includes sourceFormat or targetFormat that include param for storing a file name.

According to another aspect of the present invention, there is provided a style sheet for parsing an input XMT file including DIBR data using a schema for the DIBR data, the style sheet comprising: an XMT2BIFS style sheet used to generate a scene file for the DIBR data; and an XMT2MUX style sheet used to generate an mux file for the DIBR data.

The XMT2BIFS style sheet may output 'BitWrapper {' to a scene file when a statement of calling a BitWrapper template is executed and BITWrapper is found in the XMT file by the parsing, call a predetermined node template when node is found by the parsing, call a predetermined PointTextureEncodingParameter template when PointTextureEncodingParameter, which is one of DIBR encoding parameters for a node to be compressed, is found by the parsing, output type, buffer, and type and values thereof to the scene file when type, buffer, and url are found by the parsing; and output} to the scene file.

The predetermined node template may output node to the screen file when node is found by the parsing, call a predetermined PointTexture template when PointTexture is found by the parsing, and call a predetermined OctreeImage template when Octreeimage is found by the parsing. The predetermined PointTexture template may output 'PointTexture {' to the scene file when PointTexture is found by the parsing, output width, height, depthNbBits, depth[ ], and color[ ] and values thereof to the scene file when width, height, depth NbBits, depth, and color are found by the parsing, and output} to the scene file.

The style sheet may further comprise a simpleTexture template, which outputs 'SimpleTexture {' to the scene file when SimpleTexuter is found by the parsing, calls a predetermined depth template when depth is found by the parsing, calls a predetermined texture template when texture is found by the parsing, and outputs} to the scene file.

The predetermined depth template may output depth to the scene file when depth is found by the parsing, call a predetermined CompositeTexture2D template when CompositeTexture2D is found by the parsing, call a predetermined CompositTexutre3D template when CompositTexutre3D is found by the parsing, call a predetermined ImageTexture template when ImageTexture is found by the parsing, call a predetermined MovieTexture template when MovieTexture is found by the parsing, call a predetermined PixelTexture template when PixelTexture is found by the parsing, and call a predetermined ProtoInstance template when ProtoInstance is found by the parsing.

The style sheet may further comprise a DepthImage template, which outputs 'DepthImage {' to the scene when Depth Image is found by the parsing, outputs diTexture to the scene file when diTexture is found by the parsing and calls a predetermined diTexture template, outputs fieldOfView, nearplane, farplane, orientation, position, and orthographic, and values thereof to the scene file when fieldOfView, nearplane, farplane, orientation, position, and orthographic are found by the parsing.

The style sheet may further comprise a diTexture template, which calls a predetermined SimpleTexture template when Simple Texture is found by the parsing after diTexture has been found, and calls a predetermined PointTexture when PointTexture is found by the parsing.

The predetermined OctreeImage template may output 'OctreeImage {' to the scene file when OctreeImage is found by the parsing, output octreeResolution, octree[ ], and voxelImageIndex[ ], and values thereof to the scene file when octreeResolution, octree, and voxelImageIndex are found by the parsing, output images[ ] to the scene file when images are found by the parsing, and call a predetermined images template, and output} to the scene file.

The predetermined images template may call a predetermined DepthImage template when images are found by the parsing.

The PointTextureEncodingParameter template may output 'PointTextureEncodingParameter {' to the scene file when PointTextureEncodingParameter is found by the parsing, output condingPercent and a value thereof to the senefile when codingpercent is found by the parsing, and output} to the scene file. The XMT2BIFS style sheet may call a Body lower template when/and then Body/* are found in the XMT file by the parsing and call a Header lower template when Header/* is found by the parsing.

The XMT2BIFS style sheet may output UPDATE OD [ to the scene file when ObjectDescriptorUpdate is found in the XMT by the parsing, call a predetermined ObjectDescriptor template when OD and ObjectDescriptor are found by the parsing, call a predetermined InitialObjectDescriptor template when InitialObjectDescriptor is found by the parsing, and output] to the scene file.

The predetermined ObjectDescriptor template may output ObjectDescriptor { to the scene file when ObjectDescriptor is found by the parsing, output objectDescriptorID to the scene file when an attribute name objectDescriptorID is found by parsing, output a value of an attribute name binaryID when the attribute name binaryID is found by the parsing, call a predetermined Descr template when Descr is found by the parsing, and output} to the scene file.

The predetermined InitialObjectDescriptor template may call a predetermined Profiles template when InitialObjectDescriptor and Profiles are found by the parsing and call a predetermined Descr template when Descr is found by the parsing. The predetermined Descr template may call a predetermined esDescr template when Descr and esDescr are found by the parsing and call a predetermined ipmpDescr template when ipmpDescrPtr is found by the parsing.

The predetermined esDescr template may call a predetermined ES_Descriptor template when esDescr and ES_Descriptor are found by the parsing. The predetermined ipmpDescrPtr template may call a predetermined IPMPDescriptor template when ipmpDescrPtr and IPMP_Descriptor are found by the parsing and call a predetermined IPMP_DescriptorPointer template when IPMP_DescriptorPointer is found by the parsing.

The predetermined ES_Descriptor template may call a predetermined URL template when ES_Descriptor and URL are found by the parsing, call a predetermined StreamSourcer template when StreamSourcer is found by the parsing, calls a predetermined decConfigDescr template when decConfigDescr is found by the parsing, call a predetermined slConfigDescr template when slConfigDescr is found by the parsing, call a predetermined ipiptr template when ipiptr is found by the parsing, calls a predetermined ipIDs template when ipIDs is found by the parsing, call a predetermined ipmpDescrPtr template when ipmpDescrPtr is found by the parsing, call a predetermined langDescr template when langDescr is found by the parsing, call a predetermined regDescr template when regDescr is found by the parsing, and call a predetermined qosDescr template when qosDescr is found by the parsing.

The XMT2BIFS style sheet may call a StreamSource1 template when StreamSource is found in the XMT file by the parsing, wherein the StreamSource1 template outputs muxScript, a name of the file, and an extension of a mux file to the scene when CompressedImageFormat is found by the parsing, and outputs muxScript, a name of the file, and an extension of a mux file to the scene file when BitWrapperEncodingHints is found by the parsing.

The XMT2MUX style sheet may call a Body lower template when/and then Body/* are found in the XMT file by the parsing, and call a Header lower template when Header/* is found by the parsing. The XMT2MUX style sheet may use ODids as a template name as and objectDescriptorID as a value of the template name when ObjectDescriptorUpdate or InitialObjectDescriptor is found in the XMT file by the parsing, and call an ObjectDescriptorUpdate template or an InitialObjectDescriptor template.

The ObjectDescriptorUpdate template may call an OD template when ObjectDescriptorUpdate is found in the XMT file by the parsing, and the OD template calls an ObjectDescriptor template when OD is found in the OD template.

The XMT2MUX style sheet may comprise a decConfigDescr template, which is called when decConfigDescr is found in a predetermined upper template, and an slConfigDescr template, which is called when slConfigDescr is found in the predetermined upper template, wherein the decConfigDescr template outputs decConfigDescr DecoderConfigDescriptor { to the mux file when decConfigDescr is found by the parsing, calls a DecoderConfigDescriptor template, and outputs} to the mux file, and the slConfigDescr template outputs slConfigDescr SLConfigDescriptor { to the mux file when slConfigDescr is found by the parsing, calls an SLConfigDescriptor template, and outputs} to the mux file.

The XMT2MUX style sheet may comprise decoding information style sheet including an AFXConfig template and a DecoderConfigDescriptor template, wherein the DecoderConfigDescriptor template defines an element name as AFXconfig in a decSpecificInfo node in a DecoderConfigDescriptor node including information required for decoding, and calls the AFXConfig template when decSpecificInfo and AFXConfig are found by the parsing.

The AFXConfig template may output decSpecificinfo AFXConfig{ to the mux file when AFXConfig is found by the parsing, call an OctreeImageDecoderSpecific template when OctreeImageDecoderSpecific is found by the parsing, and call a PointTextureCompDecoderSpecific template when PointTextureCompDecoderSpecific is found by the parsing, and outputs} to the mux file. The OctreeImageDecoderSpecific template may output OctreeImageDecoderSpecific{ } to the mux file when OctreeImageDecoderSpecific is found by the parsing. The PointTextureCompDecoderSpecific template may output PointTextureCompDecoderSpecific{ } to the mux file when PointTextureCompDecoderSpecific is found by the parsing.

The XMT2MUX style sheet may output muxInfo MuxInfo {.filename when StreamSource is found in the XMT file by the parsing, output the value of url to the mux file when url is found by the parsing, call a corresponding one of an EncodingHints template, a BIFSEncodingHints template, a FBAEncodingHints template, a BitWrapperEncodingHints template, and a CompressedImageFormat template when url is not found and one of EncodingHints, BIFSEncodingHints, FBAEncodingHints, BitWrapperEncodingHints, and CompressedImageFormat are found by the parsing, wherein the found one is not EncodingHints, BitWrapperEncodingHints, or CompressedImageFormat, streamFormat BIFS is output, and output} to the mux file when} is found by the parsing.

The CompressedImageFormat template may call a corresponding one of a JPEG template, a PNG template, an MPEG4-video template, and a VTC template when CompressedImageFormat and one of JPEG, PNG, MPEG4-Video, and VTC are found by the parsing.

The JPEG template calls a sourceFormat template or a targetFormat template and output streamFormat JPEG when the JPEG template is called and JPEG is found by the parsing, the PNG template calls a sourceFormat template or a targetFormat template and outputs streamFormat PNG when the PNG template is called and PNG is found by the parsing, the MPEG4-Video template calls a sourceFormat template or a targetFormat template and outputs streamFormat MPEG4-Video when the MPEG4-Video template is called and MEPG4-Video is found by the parsing, and VTC template calls a sourceFormat template or a targetFormat template is called and outputs streamFormat VTC when the VTC template is called and VTC is found by the parsing, wherein the sourceFormat template and the targetFormat template call a param template, and the parm template outputs a value of the file name.

The BitWrapperEncodingHints template calls a BitWrapperOctreeImageEncodingHints template when BitWrapperEncodingHints and BitWrapperOctreeImageEncodingHints are found by the parsing, and calls a BitWrapperPointTextureEncodingHints template when BitWrapperPointTextureEncodingHints is found by the parsing.

The BitWrapperOctreeImageEncodingHints template calls a sourceFormat template when BitWrapperOctreeImageEncodingHints and sourceFormat are found by the parsing, calls a targetFormat template when targetFormat is found by the parsing, and outputs streamFormatOctreeImageCompression to the mux file, and the BitWrapperPointTextureEncodingHints template calls a sourceFormat template when BitWrapperPointTextureEncodingHints and sourceFormat are found by the parsing, calls a targetFormat template when targetFormat is found by the parsing, and outputs streamFormatPointTextureCompression to the mux file. The sourceFormat template and the targetFormat call a param template when param is found by the parsing, and the param template outputs a value of the file name.

According to another aspect of the present invention, there is provided a computer readable medium having embodied thereon a computer program for one of the above-described schemas and style sheets.

BRIEF DESCRIPTION OF THE DRAWINGS

The above and other features and advantages of the present invention will become more apparent by describing in detail exemplary embodiments thereof with reference to the attached drawings in which.

DETAILED DESCRIPTION OF THE INVENTION

Figure 1:
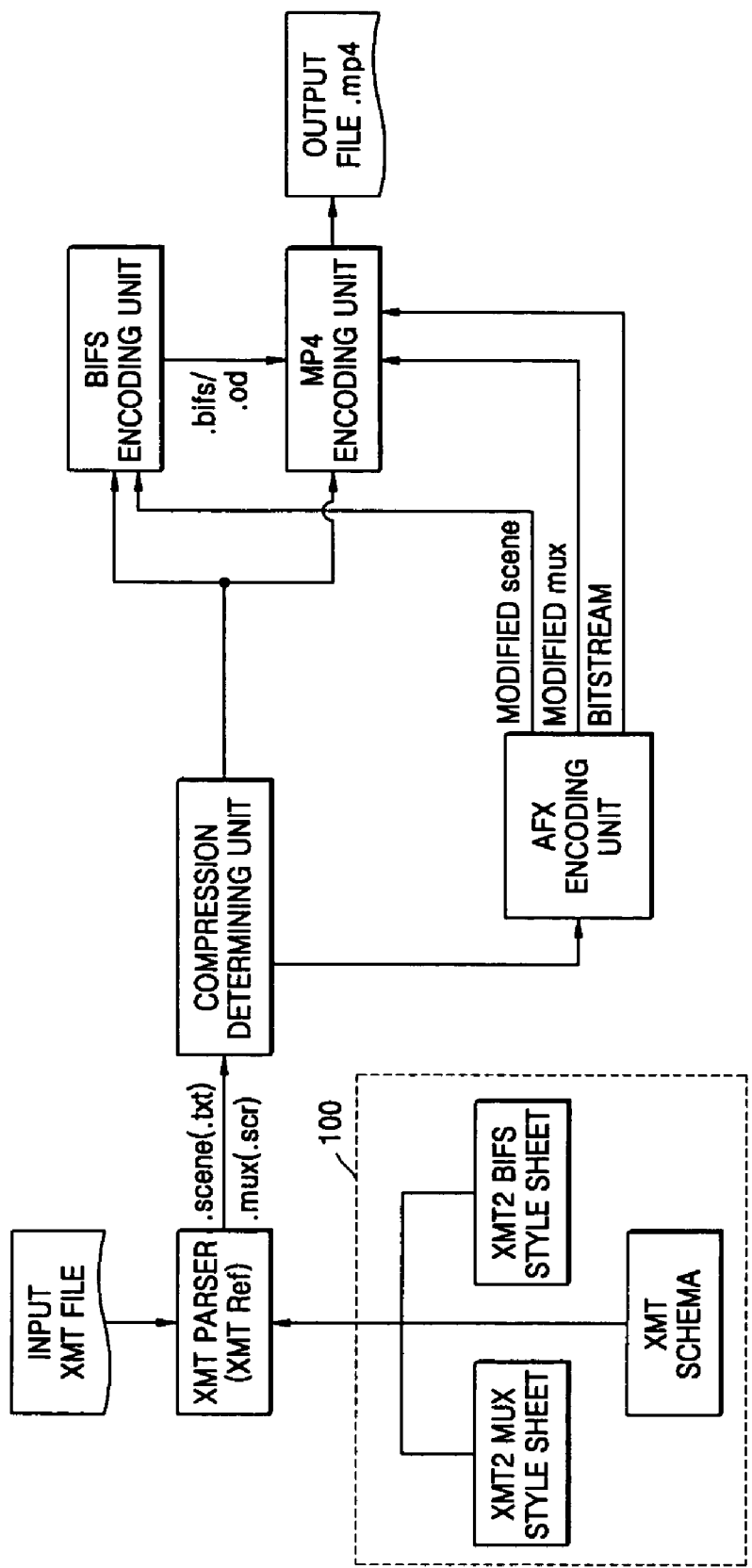
FIG. 1 illustrates a structure of a system used to generate an input file using meta representation for DIBR data compression.

Schemas and style sheets for depth image-based representation (DIBR) data according to embodiments of the present invention will be described with reference to the appended drawings.

An outline of MPEG-4 nodes will be described. MPEG4 nodes consist of a total of 180 nodes. The nodes are classified into 53 group nodes, for example, SF2DNodeType, SF3DNodeType, SFAppearanceNodeType, SFAudioNodeType, SFBAPNodeType, SFDepthImageNodeType, SFDepthTextureNodeType, SFGeometryNodeType, SFWorldNodeType, etc., according to the attribute of node data.

A BitWrapper node related to compression of DIBR data belongs to group nodes, SF2DNodeType, SF3DNodeType, SFGeometryNodeType, and SFWorldNodeType.

DIBR-related nodes include SimpleTexture, PointTexture, OctreeImage, and DepthImage. The DepthImage node belongs to group nodes, SF3DNodeType and SFDepthImageNodeType. The SimpleTexture node belongs to group nodes, SFDepthTextureNodeType and SFWorldNodeType. The PointTexture node belongs to group nodes, SFDepthTextureNodeType and SFWorldNodeType. The OctreeImage node belongs to group nodes, SF3DnodeType and SFWorldNodeType. The DepthImage node include camesal information including position, orientation, fieldOfView, nearplane, farplane, and orthographic as attributes. The PointTexture and SimpleTexture nodes are used in an SFDepthTextureNode field. The OctreeImage node includes a data filed for Octree, and the SimpleTexure node is used as texture information, i.e., images of MFDepthImageNode type.

XML will be briefly described. XML is a metalanguage. XML is a subset or a profile of standard generalized markup language (SGML). XML is a SGML that can be used on a web. SGML that cannot be used on a web is omitted in XML. XML includes the specification of hyperlinking schemas. The specification of hyperlinking schemas is referred to as Extensible Linking Language (XLL) and is provided as a distinguished language. XML includes the specification of a style language, Extensible Style sheet Language (XSL). XML is related to describing information. XML is a standard language used to structurize and describe data that can be understood by another application. XML has a logical structure and thus indicate whether to create a document or the contents of the document.

XML schemas will be briefly described. XML schemas represent common vocabularies and allow use of machines that transmit rules defined by users. XML schemas define the structures, contents and semantics of XML documents.

An XML schema is comprised of sets of components. Basic, important components of the XML schema will be described.

There are type defining components, simpleType and complexType. The simpleType component is a set of constraints that restrict strings of values to be encoded or encoding information and is utilized for the normalized values of attribute information items or element information items without children. Most of simple Type is utilized for attribute.

The complexType component is a set of attribute declarations and content types and is utilized for attributes and the children of element information items. A content type component requires children including empty without element and character information items, children including a specific simple type string, or children including a sequence of element information items (ex. group) that conform to a particular model group.

An element declaration has Type definition as name. And the element declaration is a combination of simple (or complex) and constraints.
<!ELEMENT A . . . >
<!ATTLIST A . . . >

An attribute declaration is a combination of an attribute name, simple type definition, occurrence information, and a default value.

The annotation is defined by <annotation>~</annotation>.

There are a Data type component and a Derivation component. A Sequence component defines the sequence of elements. A Choice component defines one selected from elements. Components minOccurs and maxOccurs specify a minimum number of elements that occur and a maximum number of elements that occur, respectively. A Group component is utilized to group elements having specific functions and can be referred to by other elements. A MaxInclusive component defines a maximum value for a defined base type. A MinInclusive component defines a minimum value for the defined base type.

Examples are as follows.
Example of simpleType:

```
<simpleType name="bit4">
    <restriction base="unsignedByte">
        <maxinclusive value="15"/>
    </restriction>
</simpleType>
```

Example of complexType:

```
<element name="par">
    <complexType>
        <choice minOccurs="0" maxOccurs="unbounded">
            <element ref="xmta:par" minOccurs="0"/>
            <group ref="xmta:BIFSCommandsGroup"/>
            <element ref="xmta:AnimationFrame"/>
            <group ref="xmta:OtherCommands"/>
        </choice>
        <attribute name="begin" type="xmta:SFTime" use="optional" default="0"/>
        <attribute name="atES_ID" type="IDREF" use="optional"/>
    </complexType>
</element>
```

In the above example of a simpleType element, bit4 is defined. A name attribute is defined as bit4, and the bit4 attribute is specified by a restriction element. The restriction element defines a base attribute as unsignedByte and the maxInclusive value for unsignedByte, which is a value attribute, as 15. In other words, the simpleType element defines that bit4 is an unsignedByte type and has a value from 0 to 15.

A par element includes a complexType element. The complexType element consists of 2 subelements, 2 subgroups, and 2 attributes. One of the four subelements and subgroups is selected using choice elements. It is defined in the choice element that minOccurs="0" maxOccurs="unbounded", which indicates that a minimum number of choice elements is zero and a maximum number of choice elements is unbounded. The subelements and subgroups utilize previous defied elements.

Regarding attributes, an attribute name is defined as begin, and the type of the attribute is defined as SFTime. Use of this attribute is optional, and the attribute has a default value of 0. A next attribute name is defined as atES_ID, and the type of this attribute is defined as IDREF. It is also defined that use of this attribute is optional A detailed description on attributes is as follows.

```
<xs:complexType>
    <xs:attribute ref="xml:lang" use="required"/>
    <xs:attribute ref="xml:space" default="preserve"/>
    <xs:attribute name="version" type="xs:number" fixed="1.0"/>
</xs:complexType>
```

Is it necessary to use both 'use' and 'default'? Is it possible to specify an attribute using only 'default=100'without defining ' use=optional'? It is possible to use only "default=100" without "use=optional"? 'Use' and 'default' are used to specify the values and the occurrence of attributes. 'Use' may be defined as "optional" or "required". In addition, 'default' and 'fixed' can be exclusively used. 'Use' and 'default/fixed' can be simultaneously or individually used. "Optional" means that the attribute is not necessary. "Required" means that the attribute is necessary. 'Default' allows defining a default value, and 'fixed' means only a fixed value can be used.

The present invention relates to an XMT schema and style sheets that are used to generate an input file using meta representation related to DIBR data compression. FIG. 1 illustrates a structure of a system used to generate an input file using meta representation for DIBR data compression. The XMT schema and style sheets are denoted by reference numeral 100.

Figure 2:
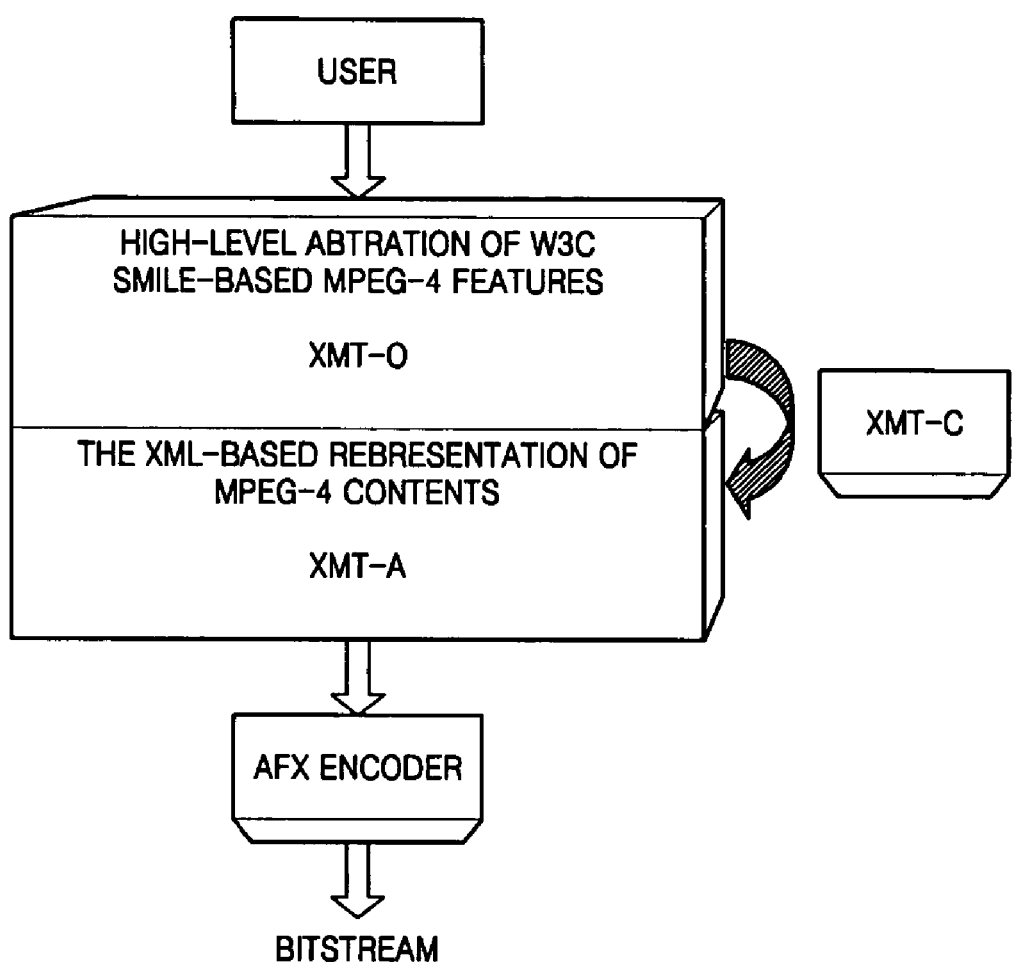
FIG. 2 illustrates the functions of XMT schemas between an end user and a program installed in a system.

XMT schemas will be briefly described. XMT schemas describe the structure of an XMT document and specifies contents therein. XMT schemas according to the MPEG-4 XMT standard include XMT-A, XMT-O, and XMT-C. XMT schemas provide an end user utilizing a program installed in a system with an easy method of controlling a variety of factors required for authoring, representing, processing and compressing data. XMT-O is used to represent in abstract form a variety of factors requested for by the end user to author (represent/process/compress) data. XMT-O defines the factors requested by the user using syntheses and semantics that are easy to understand based on a user-friendly interface. However, values defined in XMT-O cannot be directly provided to the program in the system. Therefore, XMT-A is used to transfer the factors that are represented in the easy-to-understand form for the user to the program in the system. XMT-A defines the factors requested by the end user and transferred from XMT-O to be read by the program in the system and performs mapping. XMT-A defines factors that are required for the program in the system for compression, transmission, processing, and scene construction. XMT-C defines modules that are commonly used in XMT-o and XMT-A. FIG. 2 illustrates the functions of XMT schemas between the end user and the program in the system.

Style sheets will be described below. First, XMT style sheets will be described. In general, when an input file manufactured to comply with the rules of XML schemas is received, a style sheet converts the format of the input data to a new format, i.e., forms an output format. The input data can be output in various formats according to how the style sheet is defined, even when only one schema is defined, as if a defined standard language can be translated into Korean, English, Japanese, Chinese, Spanish, etc., using a translating machine. In other words, the style sheet functions like language translating machine.

MPEG4 style sheets will be described. MPEG4-style sheets transform an input XMT file to another format, for example, IM1 textural format for files to be input to an MPEG-4 player in FIG. 3 in embodiments of the present invention.

Figure 3:
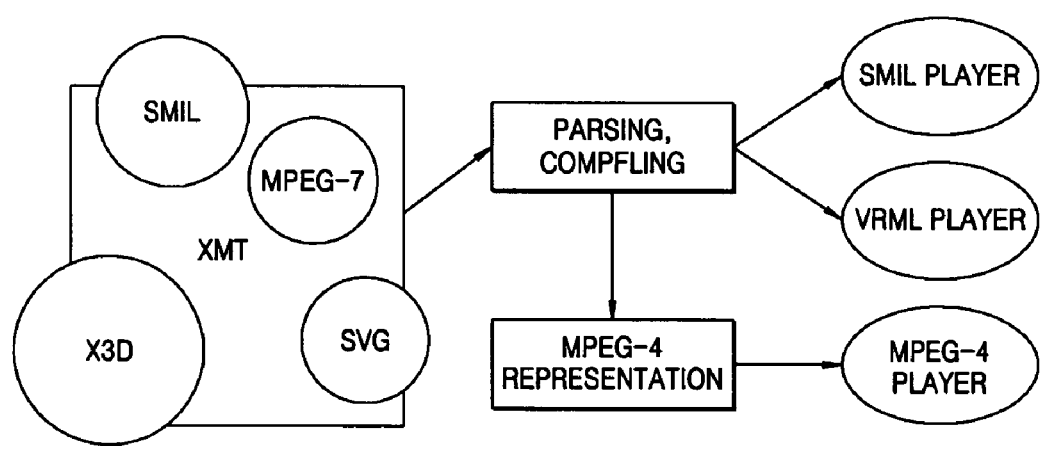
FIG. 3 is an authoring framework that allows generation of contents using textual syntaxes and MPEG-4 nodes.

FIG. 3 is an authoring framework that allows generation of contents using textual syntaxes and MPEG-4 nodes.

XMT-A schemas and style sheets according to embodiments of the present invention will be described. The syntax and semantics of the XMT-A schema will be described. XMT-A schemas are classified into xmt-a, xmta-bifs, xmta-o, and xmta-encoding according to functions. The xmt-a.xsd is the main schema used to define a type to be used in a field of an MPEG-4 node. The xmta-bifs.xsd is a BIFS schema used to define MPEG4 nodes, node fields, and the structures (header and body) of XMT files. The xmta-o.xsd is used to specify Object Descriptor. The xmta-encoding.xsd is used to specify particular nodes, for example, in connection with compression. In other words, compression parameters, information required for a decoder when decoding, etc., are specified.

The XMA-A schema syntaxes and semantics for various nodes are as follows. When defining MPEG4 nodes as elements of a corresponding schema, field nodes having a single value or multiple values is defined as attributes, and the other nodes having a field value are defined as subelements. Field names are defined as element names or attribute names.

In particular, the XMT-A schema syntaxes and semantics for DIBR nodes are as follows.

1. DepthImage Node (Xmta-bifs.xsd)

A schema syntax of a DepthImage node is as follows.

```
<complexType name="DepthImageType">
    <all>
        <element ref="xmta:IS" minOccurs="0"/>
        <element name="diTexture" form="qualified" minOccurs="0">
            <complexType>
                <group    ref="xmta:SFDepthTextureNodeType"    minOccurs="0"
/>
            </complexType>
        </element>
    </all>
    <attribute      name="farPlane"      type="xmta:SFFloat"     use="optional"
default="100"/>
    <attribute      name="fieldOfView"      type="xmta:SFVec2f"     use="optional"
default="0.785398 0.785398"/>
    <attribute      name="nearPlane"      type="xmta:SFFloat"     use="optional"
default="10"/>
    <attribute      name="orientation"      type="xmta:SFRotation"     use="optional"
default="0 0 1 0"/>
    <attribute      name="orthographic"      type="xmta:SFBool"     use="optional"
default="true"/>
    <attribute name="position" type="xmta:SFVec3f" use="optional" default="0 0
10"/>
    <attributeGroup ref="xmta:DefUseGroup"/>
    </complexType>
        <element name="DepthImage" type="xmta:DepthImageType"/>
<group name="SFDepthTextureNodeType">
    <choice>
```

-continued

```
    <element ref="xmta:PointTexture"/>
    <element ref="xmta:SimpleTexture"/>
    ...
    </choice>
</group>
```

The above schema syntax defines DepthImage node as a schema and used for depth image-based model rendering. Camera information and depth-having-texture information are included. Since it consists of a plurality of subelements and attributes, the complextype name is defined as "DepthImageType". Since all 3 subelements are necessary, the subelements are enclosed by the start tag <all> and the end tag </all>. In the first element, an element named "IS" is referred to. In addition, this element may not appear, minOccurs is defined as "0". The name of the second element is defined as "diTexture". This element has 'group' as a subelement. The name of the group is "SFDepthTextureNodeType", and an SFDepthTextureNode node schema is referred to. The SFDepthTextureNode node schema is used for "diTexture" of the DepthImage node and includes PointTexture and SimpleTexture as lower elements. Use of the SFDepthTextureNode node schema is optional. Since the subelement includes a group described above, it is defined as "complextype". Since the subelement may not include a group, it is declared that minOccurs=0. The group occurs one time if required.

The cameral information is represented using 7 attributes, i.e., attributes position, orientation, fieldOfView, nearPlane, farplane, and orthographic. The DepthImage node defines at least one of the 7 attributes as an attribute name.

An attribute having the name "farplane" is "SFFloat type", use thereof is optional, and a default value thereof is 100. An attribute having the name 'fieldOfView' is "SFVec2f type', use thereof is optional, and a default value thereof is 0.785398. An attribute having the name "nearplane" is "SFFloat type", use thereof is optional, and a default value thereof is 10. An attribute having the name "orientation" is "SFRotation type", use thereof is optional, and a default value thereof is 0 0 1 0. An attribute having the name "orthographic" is "SFBool type", use thereof is optional, and a default value thereof is "true". An attribute having the name "position" is "SFVec3f type", use thereof is optional, and a default value thereof is 0 0 10. "DefUseGroup" is referred to as an attribute group.

2. SimpleTexture Node (xmta-bifs.xsd)
A schema syntax of a SimpleTexture node is as follows.

```
<complexType name="SimpleTextureType">
    <all>
        <element ref="xmta:IS" minOccurs="0"/>
        <element name="depth" form="qualified" minOccurs="0">
            <complexType>
                <group ref="xmta:SFTextureNodeType" minOccurs="0" />
            </complexType>
        </element>
        <element name="texture" form="qualified" minOccurs="0">
            <complexType>
                <group ref="xmta:SFTextureNodeType" minOccurs="0" />
            </complexType>
        </element>
    </all>
    <attributeGroup ref="xmta:DefUseGroup"/>
</complexType>
<element name="SimpleTexture" type="xmta:SimpleTextureType"/>
```

The above schema syntax of the SimpleTexture node is used when rendering a DIBR model in 3 dimensions using an input depth image and color image. Since the schema of the SimpleTexture node includes a plurality of subelements, the complextype name is defined as "SimpleTextureType". Since it consists of 3 subelements, "complextype" is defined. The SimpleTexture node can be used in a proto node defining a new node, wherein the Simple Texture node can be used as an IS node, and an IS element is referred to. A depth element in the Simple Texture node includes depth information in image form, and a texture element therein includes color information in image form. The images are defined in an SFTextureNodeType node. "Def" or "Use" can be used for name definition and use of the SimpleTexture node. This is implemented by referring attributeGroup as DefUseGroup.

3. PointTexture Node (Xmta-bifs.xsd)
A schema syntax of a PointTexture node is as follows.

```
<complexType name="PointTextureType">
    <attribute name="color" type="xmta:MFColor" use="optional"/>
    <attribute name="depth" type="xmta:MFInt32" use="optional"/>
    <attribute name="depthNbBits" type="xmta:SFInt32" use="optional" default="7"/>
    <attribute name="height" type="xmta:SFInt32" use="optional" default="256"/>
    <attribute name="width" type="xmta:SFInt32" use="optional" default="256"/>
    <attributeGroup ref="xmta:DefUseGroup"/>
</complexType>
<element name="PointTexture" type="xmta:PointTextureType"/>
```

The above schema syntax defines the PointTexture node as a schema. Since the schema of the PointTexture node includes a plurality of attributes, the complextype name is defined as "PointTextureType". Since it consists of 6 attributes, "complextype" is defined.

The PointTexture node schema defines at least one of width, height, depthNbBits, depth, and color as an attribute name.

An attribute having the name "color" is "MFColor type", and use thereof is optional. An attribute having the name "depth" is "MFInt32 type", and use thereof is optional. "MF" in the type names means that the attribute has array values. An attribute having the name "depthNbBits" is "SFInt32 type", use thereof is optional, and a default value thereof is 7. An attribute having the name "height" is "SFInt32 type", use thereof is optional, and a default value thereof is 256. An attribute having the name "width" is "SFInt32 type", use thereof is optional, and a default value thereof is 256. "Def UseGroup" is referred to as an attribute group.

4. Octreelamge node (Xmta-bifs.xsd)
A schema syntax of an Octreelamge node is as follows.

```
<complexType name="OctreeImageType">
    <all>
        <element ref="xmta:IS" minOccurs="0"/>
        <element name="images" form="qualified" minOccurs="0">
            <complexType>
```

```
            <group      ref="xmta:SFDepthImageNodeType"
minOccurs="0" maxOccurs="unbounded"/>
          </complexType>
        </element>
      </all>
      <attribute name="octree" type="xmta:MFInt32" use="optional"/>
      <attribute    name="octreeResolution"    type="xmta:SFInt32"
use="optional" default="256"/>
      <attribute    name="voxelImageIndex"    type="xmta:MFInt32"
use="optional"/>
      <attributeGroup ref="xmta:DefUseGroup"/>
    </complexType>
  <element name="OctreeImage" type="xmta:OctreeImageType"/>
```

The above schema syntax defines the OctreeImage node as a schema. Since the schema of the OctreeImage node includes a plurality of attributes, the complextype name is defined as "OctreeImageType". Since it consists of 2 subelements and 4 attributes, "complextype" is defined. Since all the subelements are necessary, the subelements are enclosed by <all> and </all>. In the first element, an element having the name "IS" is referred to, and minOccur is defined "0", indicating that the element may not occur. The element may occur once if required. In the second element having the name "images", minOccurs is defined as "0", indicating that element may not occur. A group element "SFDepthImageNodeType" is referred to as a subelement, wherein minOccurs is defined as "0" and maxOccurs is defined as "unbounded". The second element is defined as "complextype".

The OctreeImage node schema defines at least one of octree, octreeResolution, and voxelImageIndex as an attribute name. An attribute having the name "octree" is "MFInt32 type", and use thereof is optional. An attribute having the name "octreeResolution" is "SFInt32 type", use thereof is optional, and a default value thereof is 256. An attribute having the name "voxelImageIndex" is "MFInt32 type", and use thereof is optional. "DefUseGroup" is referred to as an attribute group.

5. BitWrapper Node (Xmta-bifs.xsd)

A schema syntax of a BitWrapper node is as follows.

```
<complexType name="BitWrapperType>
  <all>
    <element ref="xmta:IS" minOccurs="0"/>
    <element name="node" form="qualified" minOccurs="0">
      <complexType>
        <group ref="xmta:SFWorldNodeType" minOccurs="0" />
      </complexType>
    </element>
    <element ref="xmta:BitWrapperEncodingParameter"/>
  </all>
  <attribute   name="type"   type="xmta:SFInt32"   use="optional"
default="0"/>
  <attribute name="url" type="xmta:MFUrl" use="optional"/>
  <attribute   name="buffer"   type="xmta:SFString"   use="optional"
default="" ""/>
  <attributeGroup ref="xmta:DefUseGroup"/>
</complexType>
<element name="BitWrapper" type="xmta:BitWrapperType"/>
```

The BitWrapper node compresses data in a node filed and transmits bitstreams using an in-band or out-band. A url field transmits out-band bitstreams, and a buffer filed transmits in-band bitstreams together with BIFS bitstreams.

When an author wishes to transmit compressed data using a BitWrapper scheme, it is necessary to allow the author to control parameters for generating bitstreams. This can be achieved using an XMT-A schema syntax.

The BitWrapper node schema is used to compress graphics data.

The BitWrapper node schema includes "node" and "BitWrapperEncodingParameter" as lower elements and includes three attributes. The three attributes have the names "type", "url", and "buffer" and the types "SFInt32", "MFUrl", and "SFString", respectively.

The node element specifies graphics data including data to be compressed and refers to SFWorldNode as a subelement. This means that SFWorldNode in node can be used by all subelements.

A compression parameter, BitWrapperEncodingParameter, will be described. A compression parameter schema defines a compression rate for point texture and is included in a node element having the name "BitWrapperEncodingParameter". An element having the name "PointTextureEncodingParameter" includes an attribute having the name "configPercent" and the type "codingPercentType". The codingPercentType has simpleType as type, its restriction base is int.

A schema syntax of BitWrapperEncodingParameter is as follows.

```
<element name="BitWrapperEncodingParameter">
  <complexType>
    <choice>
      <element    name="CoordinateInterpolatorEncodingParameter"
minOccurs="0" maxOccurs="1">
        ...
      </element>
      <element name="IndexedFaceSetEncodingParameter" minOccurs="0"
maxOccurs="1">
        ...
      </element>
      <element     name="OrientationInterpolatorEncodingParameter"
minOccurs="0" maxOccurs="1">
        ...
      </element>
      <element       name="PositionInterpolatorEncodingParameter"
minOccurs="0" maxOccurs="1">
        ...
      </element>
```

```
        <element name="MeshGridEncodingParameter" minOccurs="0"
maxOccurs="1">
            ...
        </element>
        <element name="PointTextureEncodingParameter" minOccurs="0" maxOccurs="1">
            <complexType>
                <attribute name="codingPercent"
type="xmta:codingPercentType" use="optional" default="100"/>
            </complexType>
        </element>
    </choice>
    </complexType>
</element>
```

The schema syntaxes of the BitWrapperEncodingParameter defines an encodingparameter of PointTexture as an element. The element has the name "PointTextureEncodingParameter". Regarding this element, minOccurs is defined as "0", and maxOccurs is defined as "1". Since the element includes an attribute, it is defined as "complextype". The attribute has the name "codingPercent" and the type "codingPercentType", use thereof is optional, and a default value thereof is 100.

The PointTextureEncodingParameter will be described. The PointTextureEncodingParameter includes an encoding parameter "codingpercent" used to compress PointTexture. The encoding parameter "codingPercent" determines degrees of compression for a depth value and a color value of the PointTexture.

The PointTextureEncodingParameter will be described in detail in view of XMT-A syntax. An encoding parameter used for compression of PointTexture is defined as an element having the name "PointTextureEncodingParameter". The PointTextureEncodingParameter element may not occur (minOccurs=0) or may occur once at maximum (maxOccurs=1). This element includes an attribute and is enclosed by <complexType>. The attribute has the name "codingpercent" and the type "codingPercentType", use thereof is optional, and a default value thereof is 100.

The schema syntax of the PointTextureEncodingParameter is defined in the syntax describing BitWrapperEncodingParameter in xmta-encoding.xsd.

Encoding parameters necessary for compression (decoding) will be described.

A schema syntax of an encoding parameter for PointTexture is as follows.

```
<annotation>
    <documentation>
****************************************************************
*           declaration of basic types for PointTexture         *
****************************************************************
    </documentation>
</annotation>
    <simpleType      name="codingPercentType">
        <restriction    base="int">
            <minInclusive     value="1"/>
            <maxInclusive     value=" 100"/>
        </restriction>
    </simpleType>
```

In the above schema syntax, "declaration of basic types for PointTexture" defines the type of an encoding parameter having the name "codingpercent" used for PointTexture compression. In particular, the PointTexture is defined as "simpleType" and has the name "codingPercentType". "CodingPercentType" has an integer value (integer type) ranging from 0 (minInclusive value) to 100 (maxInclusive value), which is defined in xmt-a.xsd schema after basic types of Bone-Based Animation are defined.

The schema syntax defines the attribute type "codingPercentType" in the encoding parameter element for PointTexture. The encoding parameter element is "SimpleType" and has the name "codingPercentType". A restriction base is defined as "Integer type", and a value thereof ranges from 1 (minInclusive value) to 100 (maxInclusive value).

Next, BitWrapperEncodingHints, required for encoding and decoding will be described. The BitWrapperEncodingHints is used to define information required for Muxinfo in a scrip file when the BitWrapper node is an out-band using a url field and includes at least one of sourceFormat and targetFormat as a lower element. Information required for Muxinfo in the script file includes a DIBR compression bitstream file name and a bitstream compression format.

In embodiments of the present invention, BitWrapperOctreeImageEncodingHints, which is encodinghints for OctreeImage, and BitWrapperPointTextureEncodingHints, which is encodinghints for PointTexture, are suggested.

The BitWrapperEncodingHints required for encoding and decoding are defined in xmta-encoding.xsd schema. The syntaxes of BitWrapperEncodingHints for OctreeImage and PointTexture are as follows.

```
<element name="BitWrapperEncodingHints">
<complexType>
    <choice>
        <element name="BitWrapper3DMCEncodingHints">
            <complexType>
                <sequence>
                    <element name="sourceFormat">
            </complexType>
```

-continued

```
            <sequence>
                <element ref="xmta:param" minOccurs="0" maxOccurs="unbounded"/>
            </sequence>
          </complexType>
        </element>
        <element name="targetFormat">
          <complexType>
            <sequence>
                <element ref="xmta:param" minOccurs="0" maxOccurs="unbounded"/>
            </sequence>
          </complexType>
        </element>
      </sequence>
    </complexType>
  </element>
  <element name="BitWrapperICEncodingHints">
    <complexType>
      <sequence>
        <element name="sourceFormat">
          <complexType>
            <sequence>
                <element ref="xmta:param" minOccurs="0" maxOccurs="unbounded"/>
            </sequence>
          </complexType>
        </element>
        <element name="targetFormat">
          <complexType>
            <sequence>
                <element ref="xmta:param" minOccurs="0" maxOccurs="unbounded"/>
            </sequence>
          </complexType>
        </element>
      </sequence>
    </complexType>
  </element>
  <element name="BitWrapperMeshGridEncodingHints">
  </element>
<element name="BitWrapperOctreeImageEncodingHints">
    <complexType>
      <sequence>
        <element name="sourceFormat">
          <complexType>
            <sequence>
                <element ref="xmta:param" minOccurs="0" maxOccurs="unbounded"/>
            </sequence>
          </complexType>
        </element>
        <element name="targetFormat">
          <complexType>
            <sequence>
                <element ref="xmta:param" minOccurs="0" maxOccurs="unbounded"/>
            </sequence>
          </complexType>
        </element>
      </sequence>
    </complexType>
  </element>
   <element name="OthersEncodingHints">
    <complexType>
      <sequence>
        <element name="sourceFormat">
          <complexType>
            <sequence>
                <element ref="xmta:param" minOccurs="0" maxOccurs="unbounded"/>
            </sequence>
          </complexType>
        </element>
        <element name="targetFormat">
          <complexType>
            <sequence>
                <element ref="xmta:param" minOccurs="0" maxOccurs="unbounded"/>
            </sequence>
          </complexType>
        </element>
      </sequence>
    </complexType>
  </element>
<element name="BitWrapperPointTextureEncodingHints">
    <complexType>
```

```xml
<sequence>
    <element name="sourceFormat">
        <complexType>
            <sequence>
                <element ref="xmta:param" minOccurs="0" maxOccurs="unbounded"/>
            </sequence>
        </complexType>
    </element>
    <element name="targetFormat">
        <complexType>
            <sequence>
                <element ref="xmta:param" minOccurs="0" maxOccurs="unbounded"/>
            </sequence>
        </complexType>
    </element>
</sequence>
</complexType>
</element>
<element name="BitWrapperWaveletSubdivisionSurfaceEncodingHints">
</element>
</choice>
</complexType>
</element>
```

The semantics of the schemas will be described. The BitWrapperEncodingHints is used to speficy "Muxinfo description" in a script (.mux) file when the BitWrapper node is an out-band using a "url" field and to transmit a compressed image or moving picture (CompressedImageFormat: JPEG, PNG, MPEG4-Video, VTC, etc.) included in a DIBR related node. Accordingly, an input XMT file represents the contents including a DIBR related object. When an XMT file is input, a style sheet for BitWrapperEncodinghints is called with reference to a previously defined schema to output a mux file that conforms to an MPEG4 binary textual format. In the MuxInfo description, the compression file name is defined in a param element in a sourceFormat/targetFormat element for transmission.

The syntaxes of the schemas will be described. BitWrapperOctreeImageEncodingHints and BitWrapperPointTextureEncodingHints are defined as subelements in the BitWrapperEncodingHints. Each of the subelements includes sourceFormat and targetFormat as subelements. Accordingly, the BitWrapperOctreeImageEncodingHints and the BitWrapperPointTextureEncodingHints are defined as "compexType". Both or only one of the sourceFormat and the targetFormat can be used. When using both sourceFormat and targetFormat, the sourceFormat precedes the targetFormat. Each of the sourceFormat and the targetFormat is defined as "complexType" because they include a plurality of param elements having file names. The order of the plurality of param elements is represented by sequence.

Next, "decodingspecific info" required for decoding will be described. A decoding information schema is required when the BitWrapper node is an out-band using a url field. Decoding information schemas include an AFXConfig schema and a decoderConfigDescriptor schema. The DecoderConfigDescriptor schema defines an element name as AFXconfig in a decSpecificInfo node in a DecoderConfigDescriptor node including information required for decoding.

The AFXConfig element includes information regarding a decoder that can be used to decode bitstreams. In other words, the AFXConfig element includes information regarding a decoder that can be used to decode bitsterams compressed using OctreeImage compression and PointTexture compression.

The syntactic meanings of OctreeImageDecoderSpecific and PointTextureCompDecoderSpecific in the AFXConfig will be described. The AFXConfig, which is "complexType", includes a plurality of elements, wherein one of the elements can be selectively used (<choice>~</choice>). Among pieces of information regarding multiple decoders, OctreeImageDecoderSpecific information related to use of an OctreeImage decoder for decoding bitstreams encoded by OctreeImage compression is defined in an element, and PointTextureCompDecoderSpecific information related to use of a PointTexture decoder for decoding bitstreams encoded by PointTexture compression is defined in an element.

The AFXConfig schema defines OctreeImageDecoderSpecific, which is information related to use of an OctreeImage decoder for decoding, and PointTextureCompDecoderSpecific, which is information related to use of a PointTexture decoder for decoding, as element names.

The AFXConfig is defined after the DecoderConfigDescriptor element in xmta-od.xsd. The OctreeImageDecoderSpecific information is provided for bitstreams encoded by OctreeImage compression, and PointTextureCompDecoderSpecific information is provided for bitstreams encoded by PointTexture compression. The OctreeImageDecoderSpecific element is defined after a WMDecoderSpecific element, and the PointTextureCompDecoderSpecific element is defined after a BBADecoderSpecific element.

```xml
<element name="DecoderconfigDescriptor">
    <complexType>
        <sequence>
            <element name="decSpecificInfo" form="qualified" minOccurs="0">
                <complexType>
                    <choice minOccurs="0">
```

```
                <element name="BIFSConfig" type="xmta:BIFSConfigType"/>
                <element name="BIFSv2Config" type="xmta:BIFSv2ConfigType"/>
                <element name="AFXConfig" type="xmta:AFXConfigType"/>
                <element ref="xmta:DecoderSpecificInfo"/>
            </choice>
        </complexType>
    </element>
    <element name="profileLevelIndicationIndexDescr" form="qualified" minOccurs="0">
        <complexType>
            <sequence>
                <element ref="xmta:ExtensionProfileLevelDescriptor" minOccurs="0" maxOccurs="unbounded"/>
            </sequence>
        </complexType>
    </element>
</sequence>
<attribute name="objectTypeIndication" type="xmta:objectTypeIndicationType" use="required"/>
<attribute name="streamType" type="xmta:streamTypeType" use="required"/>
<attribute name="upStream" type="boolean" use="optional" default="false"/>
<attribute name="bufferSizeDB" type="xmta:bit24a" use="optional" default="auto"/>
<attribute name="maxBitrate" type="xmta:bit32a" use="optional" default="auto"/>
<attribute name="avgBitrate" type="xmta:bit32a" use="optional" default="auto"/>
    </complexType>
</element>
<complexType name="AFXConfigType">
    <choice>
        <element name="A3DMCDecoderSpecific"/>
        <element name="CoordInterpCompDecoderSpecific"/>
        <element name="OriInterpCompDecoderSpecific"/>
        <element name="PosInterpCompDecoderSpecific"/>
        <element ref="xmta:MeshGridDecoderSpecific"/>
        <element ref="xmta:WMDecoderSpecific"/>
        <element name="OctreeImageDecoderSpecific"/>
        <element name="BBADecoderSpecific"/>
        <element name="PointTextureCompDecoderSpecific"/>
    </choice>
</complexType>
```

A CompressedImageFormat schema will be described. DIBR data (contents) including a compressed image or moving picture file can be visualized using a variety of multimedia (various applications such as players). To visualize images or moving picture to users, the DIBR data in compressed images or moving picture file must be included as a texture. To be reproduced by various multimedia, the compressed data file needs to be decoded by a decoder and combined and synchronized with other information for visualization. In the decoding process, information on the file name of the compressed image or moving picture and the bitstream format are required. The CompressedImageFormat schema is used to provide such information to a decoder.

The CompressedImageFormat schema is used to provide information (compression file name and stream format) required for decoding compressed data, such as a compressed image or moving picture in JPEG, PNG, MPEG4-Video, or VTC format, included in a DIBR related node. The CompressedImageFormat schema includes an element having the name "CompressedImageFormat" and subelements having the names "JPEG", "PNG", "MPEG4-Video", and "VTC", wherein each of the subelements includes SourceFormat or targetFormat. The sourceFormat or targetFormat include param, and a file name is stored in the param.

A syntax of the CompressedImageFormat schema is as follows.

```
<element name="CompressedImageFormat">
    <complexType>
        <choice>
            <element name="JPEG">
                <complexType>
                    <sequence>
                        <element name="sourceFormat">
                            <complexType>
                                <sequence>
                                    <element ref="xmta:param" minOccurs="0" maxOccurs="unbounded"/>
                                </sequence>
                            </complexType>
                        </element>
                        <element name="targetFormat">
                            <complexType>
                                <sequence>
                                    <element ref="xmta:param" minOccurs="0" maxOccurs="unbounded"/>
                                </sequence>
                            </complexType>
```

-continued

```
            </element>
          </sequence>
        </complexType>
      </element>
      <element name="PNG">
        <complexType>
          <sequence>
            <element name="sourceFormat">
              <complexType>
                <sequence>
                  <element ref="xmta:param" minOccurs="0" maxOccurs="unbounded"/>
                </sequence>
              </complexType>
            </element>
            <element name="targetFormat">
              <complexType>
                <sequence>
                  <element ref="xmta:param" minOccurs="0" maxOccurs="unbounded"/>
                </sequence>
              </complexType>
            </element>
          </sequence>
        </complexType>
      </element>
      <element name="MPEG4-Video">
        <complexType>
          <sequence>
            <element name="sourceFormat">
              <complexType>
                <sequence>
                  <element ref="xmta:param" minOccurs="0" maxOccurs="unbounded"/>
                </sequence>
              </complexType>
            </element>
            <element name="targetFormat">
              <complexType>
                <sequence>
                  <element ref="xmta:param" minOccurs="0" maxOccurs="unbounded"/>
                </sequence>
              </complexType>
            </element>
          </sequence>
        </complexType>
      </element>
      <element name="VTC">
        <complexType>
          <sequence>
            <element name="sourceFormat">
              <complexType>
                <sequence>
                  <element ref="xmta:param" minOccurs="0" maxOccurs="unbounded"/>
                </sequence>
              </complexType>
            </element>
            <element name="targetFormat">
              <complexType>
                <sequence>
                  <element ref="xmta:param" minOccurs="0" maxOccurs="unbounded"/>
                </sequence>
              </complexType>
            </element>
          </sequence>
        </complexType>
      </element>
    </choice>
  </complexType>
</element>
```

Style sheets for DIBR data according to embodiments of the present invention will be described in detail. A MPEG-4 style sheet converts an input XMT file to another format, for example, IM1 Textual format for input files for an MPEG-4 player.

The styles sheets for DIBR data according to embodiments of the present invention includes a XMT2BIFS style sheet for generating a scene file for the DIBR data and a XMT2MUX style sheet for generating a mux file for the DIBR data.

There are style sheets for IC, 3DMC, BitWrapper, DIBR, BitWrapperEncodingHints, and AFXConfig nodes. A body part, i.e., scene related data, in an input XMT file, is process in XMT2BIFS.XSL and output to the scene file. A header part, i.e., objectdescriptor data, in the input XMT file is processed in XMT2MUX.XSL and output to the mux file.

Initially, XMT2BIFS.XSL will be described. This style sheet defines an element and a group as templates. Regarding a BitWrapper node, the contents of the BitWrapper node in the XMT file is parsed with reference to BitWrapper in the schema. To obtain a scene output file that is compatible with IM1 textual format, a geometry group that enables to find BitWrapper has to be declared. The XMT2BIFS style sheet defines BitWrapper in apply-templates of the geometry template. In other words, a BitWrapper template to be called is declared in the geometry template.

```
<xsl:template match="xmt:geometry">
  geometry <xsl:if test="@DEF">DEF <xsl:value-of select="@DEF" /><xsl:text>
  </xsl:text></xsl:if>
        <xsl:apply-templates select="xmt:Text |xmt:Bitmap |xmt:Box |xmt:Circle |xmt:Cone
|xmt:Curve2D    |xmt:Cylinder   |xmt:ElevationGrid   |xmt:Extrusion   |xmt:Hierarchical3DMesh
|xmt:IndexedFaceSet   |xmt:IndexedFaceSet2D   |xmt:IndexedLineSet   |xmt:IndexedLineSet2D
|xmt:PointSet            |xmt:PointSet2D              |xmt:Rectangle
|xmt:Sphere|xmt:BitWrapper|xmt:ProtoInstance|xmt:MeshGrid"/>
    </xsl:template>
```

The contents of the BitWrapper node in the XMT file is parsed with reference to BitWrapper in the schema, and the XMT file is converted into a scene output file that is compatible with the IM1 textual format.

The XMT2BIFS style sheet outputs 'BitWrapper {' to a scene file when BitWrapper is found in the XMT file by parsing, calls a predetermined node template when "node" is found by the parsing, calls a predetermined PointTextureEncodingParameter template when PointTextureEncodingParameter among DIBR encoding parameters for a compressed node is found by the parsing, outputs type, buffer, and url and values thereof to the scene file when "type", "buffer", and "url" are found by the parsing, and outputs} to the scene file. An example of the XMT2BIFS style sheet is as follows.

```
<xsl:template match= xmt:BitWrapper >
    <xsl:choose>
    <xsl:when test="@USE">USE <xsl:value-of select="@USE"/> </xsl:when>
    <xsl:otherwise><xsl:if test="@DEF">DEF <xsl:value-of select="@DEF"/></xsl:if>BitWrapper {
    <xsl:if test="xmt:IS"><xsl:call-template name = "IS" /></xsl:if>
    <xsl:apply-templates select="xmt:node" /><xsl:text>
    </xsl:text>
    <xsl:apply-templates select="xmt:PositionInterpolatorEncodingParameter
|xmt:OrientationInterpolatorEncodingParameter
|xmt:CoordinateInterpolatorEncodingParameter
|xmt:IndexedFaceSetEncodingParameter
|xmt:MeshGridEncodingParameter|xmt:PointTextureEncodingParameter"/><xsl:text>
    </xsl:text>
    <xsl:if test="@type">type <xsl:value-of select= "@type" /><xsl:text>
    </xsl:text>
    </xsl:if>
       <xsl:if test="@buffer">buffer "<xsl:value-of select= "@buffer" />"<xsl:text>
    </xsl:text>
    </xsl:if>
       <xsl:if test="@url">url <xsl:value-of select= "@url" /><xsl:text>
    </xsl:text>
    </xsl:if>
        }</xsl:otherwise></xsl:choose></xsl:template>
```

"node" is declared as follows.

```
<xsl:template match="xmt:node">
    node <xsl:apply-templates select="xmt:CoordinateInterpolator
|xmt:OrientationInterpolator |xmt:PositionInterpolator |xmt:IndexedFaceSet
|xmt:IndexedFaceSet2D |xmt:IndexedLineSet |xmt:IndexedLineSet2D
|xmt:Cone |xmt:Curve2D |xmt:Cylinder |xmt:ElevationGrid |xmt:Extrusion
|xmt:Hierarchical3DMesh |xmt:Rectangle |xmt:Sphere
|xmt:OctreeImage|xmt:MeshGrid|xmt:PointTexture" />
</xsl:template>
```

A node template outputs "node" to the scene file when "node" is found by parsing, calls a predetermined Point Texture template when PointTexture is found by the parsing, and calls a predetermined OctreeImage template when OctreeImage is found by the parsing.

DIBR nodes include a PointTexture node and an OctreeImage node. The contents of a DIBR node in the XMT file are parsed with reference to DIBR in the schema, and the XMT file is converted into a scene output file that is compatible with the IM1 textual format.

A PointTexture template outputs 'PointTexture {' to the scene file when PointTexture is found by the parsing, outputs width, height, depthNbBits, depth[ ], and color[ ] and values thereof to the scene file when "width", "height", "depthNbBits", "depth", and "color" are found by the parsing, and outputs} to the scene file. An example of a style sheet for the PointTexture template is as follows.

```
<xsl:template match="xmt:PointTexture">
<xsl:choose>
<xsl:when test="@USE">USE <xsl:value-of select="@USE"/> </xsl:when>
<xsl:otherwise><xsl:if test="@DEF">DEF <xsl:value-of select="@DEF"/></xsl:if>
<xsl:if test="xmt:IS"><xsl:call-template name="IS"/></xsl:if>
    PointTexture { <xsl:text>
</xsl:text>
<xsl:if test="@width">    width <xsl:value-of select="@width"/> <xsl:text>
</xsl:text></xsl:if>
<xsl:if test="@height">    height <xsl:value-of select="@height"/> <xsl:text>
</xsl:text></xsl:if>
<xsl:if test="@depthNbBits">    depthNbBits <xsl:value-of select="@depthNbBits"/><xsl:text>
</xsl:text></xsl:if>
<xsl:if test="@depth">    depth [ <xsl:value-of select="@depth"/> ] <xsl:text>
</xsl:text></xsl:if>
<xsl:if test="@color">    color [ <xsl:value-of select="@color"/> ] <xsl:text>
</xsl:text></xsl:if>
    }
</xsl:otherwise>
</xsl:choose>
</xsl:apply-templates />
</xsl:template>
```

A depth template outputs "depth" to the scene file when "depth" is found by the parsing, calls a predetermined CompositeTexture2D template when CompositeTexture2D is found by the parsing, calls a predetermined CompositTexutre3D template when CompositTexutre3D is found by the parsing, calls a predetermined ImageTexture template when ImageTexture is found by the parsing, calls a predetermined MovieTexture template when MovieTexture is found by the parsing, calls a predetermined PixelTexture template when PixelTexture is found by the parsing, and calls a predetermined ProtoInstance template when ProtoInstance is found by the parsing. An example of a style sheet for the depth template is as follows.

```
<xsl:template match="xmt:depth">
    depth <xsl:apply-templates select="xmt:CompositeTexture2D |xmt:CompositeTexture3D
|xmt:ImageTexture |xmt:MovieTexture |xmt:PixelTexture |xmt:ProtoInstance" />
</xsl:template>
<xsl:template match="xmt:texture">
    texture <xsl:apply-templates select="xmt:CompositeTexture2D |xmt:CompositeTexture3D
|xmt:ImageTexture |xmt:MovieTexture |xmt:PixelTexture |xmt:ProtoInstance" />
<xsl:template>
```

A SimpleTexture template outputs 'SimpleTexture {' to the scene file when SimpleTexture is found by the parsing, calls a predetermined depth template when "depth" is found by the parsing, calls a predetermined texture template when "texture" is found by the parsing, and outputs} to the scene file. An example of a style sheet for the SimpleTexture template is as follows.

```
<xsl:template match="xmt:SimpleTexture">
<xsl:choose>
<xsl:when test="@USE">USE <xsl:value-of select="@USE"/>
</xsl:when>
<xsl:otherwise><xsl:if test="@DEF">DEF <xsl:value-of select="@DEF"/></xsl:if>
<xsl:if test="xmt:IS"><xsl:call-template name="IS"/></xsl:if>
```

-continued

```
SimpleTexture {
<xsl:apply-templates select="xmt:depth|xmt:texture"/>
}
</xsl:otherwise>
</xsl:choose>
</xsl:template>
```

A diTexture template calls a predetermined SimpleTexture template when diTexture is found by the parsing, calls a predetermined SimpleTexture template when "SimpleTexture" is found by the parsing, and calls a predetermined PointTexture when PointTexture is found by the parsing. An example of a style sheet for the diTexture template is as follows.

```
<xsl:template match="xmt:diTexture">
<xsl:choose>
<xsl:when test="@USE">USE <xsl:value-of select="@USE"/> </xsl:when>
<xsl:otherwise><xsl:if test="@DEF">DEF <xsl:value-of select="@DEF"/></xsl:if>
<xsl:if test="xmt:IS"><xsl:call-template name="IS"/></xsl:if>
</xsl:otherwise>
</xsl:choose>
<xsl:choose>
<xsl:when test="xmt:SimpleTexture"><xsl:apply-templates select="xmt:SimpleTexture"/></xsl:when>
<xsl:otherwise><xsl:if test="xmt:PointTexture"><xsl:apply-templates select="xmt:PointTexture"/></xsl:if></xsl:otherwise>
</xsl:choose>
</xsl:template>
```

A DepthImage template outputs 'DepthImage {' to the scene file when DepthImage is found by the parsing, outputs "diTexture" to the scene file when "diTexture" is found, calls a predetermined diTexture template, outputs fieldOfView, nearplane, farplane, orientation, position, and orthographic, and values thereof to the scene file when "fieldOfView", "nearPlane", "farPlane", "orientation", "position", and "orthographic" are found by the parsing, and outputs} to the scene file. An example of a style sheet for the DepthImage template is as follows.

```
<xsl:template match="xmt:DepthImage">
<xsl:choose>
<xsl:when test="@USE">USE <xsl:value-of select="@USE"/></xsl:when>
<xsl:otherwise><xsl:if test="@DEF">DEF <xsl:value-of select="@DEF"/></xsl:if>
<xsl:if test="xmt:IS"><xsl:call-template name="IS"/></xsl:if>
    DepthImage {<xsl:text>
</xsl:text>
<xsl:if test="xmt:diTexture">        diTexture <xsl:apply-templates select="xmt:diTexture"/></xsl:if><xsl:text>
</xsl:text>
<xsl:if test="@fieldOfView">    fieldOfView <xsl:value-of select="@fieldOfView"/> <xsl:text>
</xsl:text></xsl:if>
<xsl:if test="@nearPlane">    nearPlane <xsl:value-of select="@nearPlane"/> <xsl:text>
</xsl:text></xsl:if>
<xsl:if test="@farPlane">    farPlane <xsl:value-of select="@farPlane"/> <xsl:text>
</xsl:text></xsl:if>
<xsl:if test="@orientation">    orientation <xsl:value-of select="@orientation"/> <xsl:text>
</xsl:text></xsl:if>
<xsl:if test="@position">    position <xsl:value-of select="@position"/> <xsl:text>
</xsl:text></xsl:if>
<xsl:if test="@orthographic">    orthographic <xsl:value-of select="@orthographic"/> <xsl:text>
</xsl:text></xsl:if>
    }
</xsl:otherwise>
</xsl:choose>
</xsl:template>
```

An images template calls a predetermined DepthImage template when images are found by the parsing. An example of a style sheet for the images template is as follows.

```
<xsl:template match="xmt:images">
  <xsl:apply-templates select="xmt:DepthImage" />
</xsl:template>
```

An OctreeImage template outputs 'OctreeImage {' to the scene file when OtrreeImage is found by the parsing, octreeResolution, octree[ ], and voxelImageIndex[ ], and values thereof to the scene file when "octreeResolution", "octree", and "voxelImageIndex" are found by the parsing, outputs images[ ] to the scene file when "images" is found by the parsing, calls a predetermined images template, and outputs} to the scene file. An example of a style sheet of the OctreeImage template is as follows.

```
<xsl:template match="xmt:OctreeImage">
<xsl:choose>
<xsl:when test="@USE">USE <xsl:value-of select="@USE"/>
</xsl:when>
<xsl:otherwise><xsl:if test="@DEF">DEF
<xsl:value-of select="@DEF"/></xsl:if> OctreeImage {
<xsl:if test="xmt:IS"><xsl:call-template name="IS"/></xsl:if>
```

-continued

```
<xsl:if test="@octreeResolution">octreeResolution <xsl:value-of select="@octreeResolution"/>
<xsl:text>
</xsl:text></xsl:if>
<xsl:if test="@octree">octree [ <xsl:value-of select="@octree"/> ]<xsl:text>
</xsl:text></xsl:if>
<xsl:if test="@voxelImageIndex">voxelImageIndex [
<xsl:value-of select="@voxelImageIndex"/> ]<xsl:text>
</xsl:text></xsl:if>
<xsl:if test="xmt:images">
images [
<xsl:apply-templates select="xmt:images" />
]
</xsl:if>
}
</xsl:otherwise>
</xsl:choose>
</xsl:template>
```

Regarding 3DMC nodes and Interpolator nodes (CoordinateInterpolator, PositionInterpolator, and OrientationInterpolator), the contents of Indexedfaceset nodes and Interpolator nodes in the XMT file are parsed with reference to the definition related thereto in the schema, and the XMT file is converted into a scene output file that is compatible with the IM1 textual format.

```
<xsl:template match="xmt:OrientationInterpolator">
    <xsl:choose>
        <xsl:when test="@USE">USE <xsl:value-of select="@USE"/> </xsl:when>
        <xsl:otherwise><xsl:if test="@DEF">DEF <xsl:value-of select="@DEF"/></xsl:if>
OrientationInterpolator {
        <xsl:if test="xmt:IS"><xsl:call-template name = "IS" /></xsl:if>
        <xsl:if test="xmt:Predictive"><xsl:call-template name="Predictive" /></xsl:if>
        <xsl:if test="@key">key [ <xsl:value-of select="@key" />]<xsl:text>
        </xsl:text>
        </xsl:if>
        <xsl:if test="@keyValue">keyValue [ <xsl:value-of select="@keyValue" />]<xsl:text>
        </xsl:text>
        </xsl:if>
    }</xsl:otherwise></xsl:choose></xsl:template>
    <xsl:template match="xmt:PositionInterpolator">
        <xsl:choose>
        <xsl:when test="@USE">USE <xsl:value-of select="@USE"/> </xsl:when>
        <xsl:otherwise><xsl:if test="@DEF">DEF <xsl:value-of select="@DEF"/></xsl:if>
PositionInterpolator {
            <xsl:if test="xmt:IS"><xsl:call-template name = "IS" /></xsl:if>
            <xsl:if test="xmt:Predictive"><xsl:call-template name="Predictive" /></xsl:if>
            <xsl:if test="@key">key [ <xsl:value-of select="@key" />]<xsl:text>
            </xsl:text>
            </xsl:if>
            <xsl:if test="@keyValue">keyValue [ <xsl:value-of select="@keyValue" />]<xsl:text>
            </xsl:text>
            </xsl:if>
        }</xsl:otherwise></xsl:choose></xsl:template>
        <xsl:template match="xmt:CoordinateInterpolator">
            <xsl:choose>
            <xsl:when test="@USE">USE <xsl:value-of select="@USE"/> </xsl:when>
            <xsl:otherwise><xsl:if test="@DEF">DEF <xsl:value-of select="@DEF"/></xsl:if>
CoordinateInterpolator {
            <xsl:if test="xmt:IS"><xsl:call-template name = "IS" /></xsl:if>
            <xsl:if test="xmt:Predictive"><xsl:call-template name="Predictive" /></xsl:if>
            <xsl:if test="@key">key [ <xsl:value-of select="@key" />]<xsl:text>
            </xsl:text>
            </xsl:if>
            <xsl:if test="@keyValue">keyValue [ <xsl:value-of select="@keyValue" />]<xsl:text>
            </xsl:text>
            </xsl:if>
        }</xsl:otherwise></xsl:choose></xsl:template>
        <xsl:template match="xmt:IndexedFaceSet">
```

```
<xsl:choose>
    <xsl:when test="@USE">USE <xsl:value-of select="@USE"/> </xsl:when>
    <xsl:otherwise><xsl:if    test="@DEF">DEF    <xsl:value-of    select="@DEF"/></xsl:if>
IndexedFaceSet {
    <xsl:if test="xmt:IS"><xsl:call-template name = "IS" /></xsl:if>
    <xsl:if test="@ccw">ccw <xsl:value-of select="@ccw" /><xsl:text>
    </xsl:text>
    </xsl:if>
    <xsl:if test="@colorIndex">colorIndex [ <xsl:value-of select="@colorIndex" />]<xsl:text>
    </xsl:text>
    </xsl:if>
    <xsl:if test="@colorPerVertex">colorPerVertex    <xsl:value-of    select="@colorPerVertex"
/><xsl:text>
    </xsl:text>
    </xsl:if>
    <xsl:if test="@convex">convex <xsl:value-of select="@convex" /><xsl:text>
    </xsl:text>
    </xsl:if>
    <xsl:if test="@coordIndex">coordIndex [ <xsl:value-of select="@coordIndex" /> ]<xsl:text>
    </xsl:text>
    </xsl:if>
    <xsl:if test="@creaseAngle">creaseAngle <xsl:value-of select="@creaseAngle" /><xsl:text>
    </xsl:text>
    </xsl:if>
    <xsl:if test="@normalIndex">normalIndex [ <xsl:value-of select="@normalIndex" />]<xsl:text>
    </xsl:text>
    </xsl:if>
  <xsl:if test="@normalPerVertex">normalPerVertex    <xsl:value-of    select="@normalPerVertex"
/><xsl:text>
    </xsl:text>
    </xsl:if>
    <xsl:if test="@solid">solid <xsl:value-of select="@solid" /><xsl:text>
    </xsl:text>
    </xsl:if>
    <xsl:if test="@texCoordIndex">texCoordIndex   [   <xsl:value-of   select="@texCoordIndex"
/>]<xsl:text>
    </xsl:text>
    </xsl:if>
  <xsl:apply-templates />
    }</xsl:otherwise></xsl:choose></xsl:template>
  <xsl:template match="xmt:coord">
  coord <xsl:if test="@DEF">DEF    <xsl:value-of select="@DEF" /><xsl:text>
  </xsl:text></xsl:if>
  <xsl:apply-templates select="xmt:Coordinate |xmt:Coordinate2D|xmt:ProtoInstance" />
    </xsl:template>
```

IndexedFaceSetEncodingParameter in the XMT file is found by the parsing with reference to an IndexedFaceSetEncodingParameter element in the schema, and the XMT file is converted into a scene output file that is compatible with the IM1 textual format.

```
<xsl:template match="xmt:IndexedFaceSetEncodingParameter">
  IndexedFaceSetEncodingParameter {
  <xsl:if test="@coordQBits">coordQBits <xsl:value-of select="@coordQBits"/><xsl:text>
  </xsl:text></xsl:if>
  <xsl:if test="@normalQBits">normalQBits <xsl:value-of select="@normalQBits"/><xsl:text>
  </xsl:text></xsl:if>
  <xsl:if test="@colorQBits">colorQBits <xsl:value-of select="@colorQBits"/><xsl:text>
  </xsl:text></xsl:if>
  <xsl:if test="@texCoordQBits">texCoordQBits <xsl:value-of select="@texCoordQBits"/><xsl:text>
  </xsl:text></xsl:if>
    <xsl:if    test="@coordPredMode">coordPredMode         <xsl:value-of
select="@coordPredMode"/><xsl:text>
  </xsl:text></xsl:if>
    <xsl:if    test="@normalPredMode">normalPredMode         <xsl:value-of
select="@normalPredMode"/><xsl:text>
  </xsl:text></xsl:if>
    <xsl:if    test="@colorPredMode">colorPredMode         <xsl:value-of
select="@colorPredMode"/><xsl:text>
  </xsl:text></xsl:if>
    <xsl:if    test="@texCoordPredMode">texCoordPredMode        <xsl:value-of
```

```
                                        -continued
select="@texCoordPredMode"/><xsl:text>
    </xsl:text></xsl:if>
    <xsl:if    test="@errorResilience">errorResilience        <xsl:value-of
select="@errorResilience"/><xsl:text>
    </xsl:text></xsl:if>
    <xsl:if test="@bitsPerPacket">bitsPerPacket <xsl:value-of select="@bitsPerPacket"/><xsl:text>
    </xsl:text></xsl:if>
    <xsl:if    test="@boundaryPrediction">boundaryPrediction        <xsl:value-of
select="@boundaryPrediction"/></xsl:if>
    }
        </xsl:template>
```

CoordinateInterpolatorEncodingParameter in the XMT file is found by the parsing with reference to a CoordinateInterpolatorEncodingParameter element in the schema, and the XMT file is converted into a scene output file that is compatible with the IM1 textual format.

```
<xsl:template match="xmt:CoordinateInterpolatorEncodingParameter">
    <xsl:choose>
    <xsl:when test="@USE">USE <xsl:value-of select="@USE"/> </xsl:when>
    <xsl:otherwise><xsl:if test="@DEF">DEF <xsl:value-of select="@DEF"/></xsl:if>
    CoordinateInterpolatorEncodingParameter {
    <xsl:if test="@keyQBits">keyQBits        <xsl:value-of select="@keyQBits"/><xsl:text>
    </xsl:text></xsl:if>
    <xsl:if test="@keyValueQBits">keyValueQBits        <xsl:value-of
select="@keyValueQBits"/><xsl:text>
    </xsl:text></xsl:if>
    <xsl:if test="@transpose">transpose    <xsl:value-of select="@transpose"/><xsl:text>
    </xsl:text></xsl:if>
    <xsl:if       test="@linearKeycoder">linearKeycoder          <xsl:value-of
select="@linearKeycoder"/><xsl:text>
    </xsl:text></xsl:if>
    }
    </xsl:otherwise>
    </xsl:choose>
        </xsl:template>
```

OrientationInterpolatorEncodingParameter in the XMT file is found by the parsing with reference to an OrientationInterpolatorEncodingParameter element in the schema, and the XMT file is converted into a scene output file that is compatible with the IM1 textual format.

```
<xsl:template match="xmt:OrientationInterpolatorEncodingParameter">
    <xsl:choose>
    <xsl:when test="@USE">USE <xsl:value-of select="@USE"/> </xsl:when>
    <xsl:otherwise><xsl:if test="@DEF">DEF <xsl:value-of select="@DEF"/></xsl:if>
    OrientationInterpolatorEncodingParameter {
    <xsl:if test="@keyQBits">keyQBits    <xsl:value-of select="@keyQBits"/><xsl:text>
    </xsl:text></xsl:if>
    <xsl:if test="@keyValueQBits">keyValueQBits    <xsl:value-of
select="@keyValueQBits"/><xsl:text>
    </xsl:text></xsl:if>
    <xsl:if       test="@preservingMode">preservingMode          <xsl:value-of
select="@preservingMode"/><xsl:text>
    </xsl:text></xsl:if>
    <xsl:if test="@dpcmMode">dpcmMode    <xsl:value-of select="@dpcmMode"/><xsl:text>
    </xsl:text></xsl:if>
    <xsl:if test="@aacMode_X">aacMode_X <xsl:value-of select="@aacMode_X"/><xsl:text>
    </xsl:text></xsl:if>
    <xsl:if test="@aacMode_Y">aacMode_Y <xsl:value-of select="@aacMode_Y"/><xsl:text>
    </xsl:text></xsl:if>
    <xsl:if test="@aacMode_Z">aacMode_Z <xsl:value-of select="@aacMode_Z"/><xsl:text>
    </xsl:text></xsl:if>
    <xsl:if       test="@linearKeycoder">linearKeycoder          <xsl:value-of
```

```
-continued select="@linearKeycoder"/><xsl:text>
    </xsl:text></xsl:if>
  }
  </xsl:otherwise>
  </xsl:choose>
      </xsl:template>
```

PositionInterpolatorEncodingParameter in the XMT file is found by the parsing with reference to a PositionInterpolatorEncodingParameter element in the schema, and the XMT file is converted into a scene output file that is compatible with the IM1 textual format.

```
<xsl:template match="xmt:PositionInterpolatorEncodingParameter">
  <xsl:choose>
  <xsl:when test="@USE">USE <xsl:value-of select="@USE"/> </xsl:when>
  <xsl:otherwise><xsl:if test="@DEF">DEF <xsl:value-of select="@DEF"/></xsl:if>
  PositionInterpolatorEncodingParameter {
  <xsl:if test="@keyQBits">keyQBits     <xsl:value-of select="@keyQBits"/><xsl:text>
  </xsl:text></xsl:if>
  <xsl:if test="@keyValueQBits">keyValueQBits   <xsl:value-of
select="@keyValueQBits"/><xsl:text>
  </xsl:text></xsl:if>
  <xsl:if    test="@preservingMode">preservingMode        <xsl:value-of
select="@preservingMode"/><xsl:text>
  </xsl:text></xsl:if>
  <xsl:if test="@dpcmMode_X">dpcmMode_X    <xsl:value-of
select="@dpcmMode_X"/><xsl:text>
  </xsl:text></xsl:if>
  <xsl:if test="@dpcmMode_Y">dpcmMode_Y    <xsl:value-of
select="@dpcmMode_Y"/><xsl:text>
  </xsl:text></xsl:if>
  <xsl:if test="@dpcmMode_Z">dpcmMode_Z    <xsl:value-of
select="@dpcmMode_Z"/><xsl:text>
  </xsl:text></xsl:if>
  <xsl:if test="@aacMode_X">aacMode_X    <xsl:value-of select="@aacMode_X"/><xsl:text>
  </xsl:text></xsl:if>
  <xsl:if test="@aacMode_Y">aacMode_Y    <xsl:value-of select="@aacMode_Y"/><xsl:text>
  </xsl:text></xsl:if>
  <xsl:if test="@aacMode_Z">aacMode_Z    <xsl:value-of select="@aacMode_Z"/><xsl:text>
  </xsl:text></xsl:if>
  <xsl:if    test="@linearKeycoder">linearKeycoder        <xsl:value-of
select="@linearKeycoder"/><xsl:text>
  </xsl:text></xsl:if>
  <xsl:if test="@intra_X">intra_X   <xsl:value-of select="@intra_X"/><xsl:text>
  </xsl:text></xsl:if>
  <xsl:if test="@intra_Y">intra_Y   <xsl:value-of select="@intra_Y"/><xsl:text>
  </xsl:text></xsl:if>
  <xsl:if test="@intra_Z">intra_Z   <xsl:value-of select="@intra_Z"/><xsl:text>
  </xsl:text></xsl:if>
  }
  </xsl:otherwise>
  </xsl:choose>
      </xsl:template>
```

PointTextureEncodingParameter in the XMT file is found by the parsing with reference to a PointTextureEncodingParameter element in the schema, and the XMT file is converted into a scene output file that is compatible with the IM1 textual format.

A PointTextureEncodingParameter template outputs PointTextureEncodingParameter { to the scene file when PointTextureEncodingParameter is found by the parsing, outputs "condingpercent" and a value thereof to the scene when "codingPercent" is found by the parsing, and outputs } to the scene file. An example of a style sheet for the PointTextureEncodingParameter template is as follows.

```
<xsl:template match="xmt:PointTextureEncodingParameter">
  <xsl:choose>
  <xsl:when test="@USE">USE <xsl:value-of
select="@USE"/></xsl:when>
  <xsl:otherwise><xsl:if test="@DEF">DEF <xsl:value-of
select="@DEF"/></xsl:if>
  PointTextureEncoding Parameter {
  <xsl:if test="@codingPercent">codingPercent <xsl:value-of
select="@codingPercent"/><xsl:text>
  </xsl:text></xsl:if>
  }
```

```
        </xsl:otherwise>
    </xsl:choose>
</xsl:template>
```

XMT2BIFS defines information necessary in the input XMT file. Only body information is originally allowed to be used. However, header information is also required to output a file in IM1 textual format according to the XMT standard specification. Thus, to use Header information in XMT2BIFS style sheet, it is defined as follows.

```
<xsl:template match="/">
    <xsl:apply-templates select="xmt:XMT-A/xmt:Body/*" />
    <xsl:apply-templates select="xmt:XMT-A/xmt:Header/*" />
</xsl:template>
```

A XMT2BIFS style sheet calls a lower template of Body when/and then Body/* are found in the XMT file by the parsing and calls a lower template of Header when Header/* is found by the parsing.

ObjectDescriptorUpdate should be compatible with the IM1 textual format. The XMT2BIFS style sheet outputs UPDATE OD [ to the scene file when ObjectDescriptorUpdate is found in the XMT file by parsing, calls an ObjectDescriptor template when OD and then ObjectDescriptor are found by the parsing, calls an InitialObjectDescriptor template when InitialObjectDescriptor is found by the parsing, calls a predetermined ObjectDescriptor template when ObjectDescriptor is found by the parsing, calls a predetermined InitialObjectDescriptor template when InitialObjectDescriptor is found by the parsing, and outputs] to the scene file.

```
<xsl:template match="xmt:ObjectDescriptorUpdate">
    UPDATE OD [
        <xsl:for-each select="xmt:OD">   <xsl:apply-templates select="xmt:ObjectDescriptor|xmt:InitialObjectDescriptor"/>
        </xsl:for-each>
    ]
</xsl:template>
```

A necessary part is retrieved from XMT2MUX. To obtain a scene file that is compatible with the IM1 textual format, the following parts in XMT2MUX are required.

An ObjectDescriptor template outputs ObjectDescriptor (to the scene file when ObjectDescriptor is found by the parsing, outputs objectDescriptorID to the scene file when an attribute having the name "objectDescriptorID" is found by the parsing, outputs a value of an attribute having the name "binaryID" when the attribute is found by the parsing, calls a predetermined Descr template when Descr is found by the parsing, and outputs} to the scene file.

```
<xsl:template match="xmt:ObjectDescriptor">   ObjectDescriptor {
    <xsl:if test="@objectDescriptorID">objectDescriptorID <xsl:value-of select="@binaryID"/><xsl:text>
    </xsl:text> </xsl:if>
    <xsl:apply-templates select="xmt:Descr"/>
    }
</xsl:template>
```

An InitialObjectDescriptor template calls a predetermined Profiles template when InitialObjectDescriptor and then Profiles are found by the parsing, and calls a predetermined Descr template when Descr is found by the parsing.

```
<xsl:template match="xmt:InitialObjectDescriptor">
    <xsl:apply-templates select="xmt:Profiles | xmt:Descr"/>
</xsl:template>
<xsl:template match="xmt:Profiles">
    <xsl:if test="@ODProfileLevelIndication"> ODProfileLevelIndication  <xsl:value-of select="@ODProfileLevelIndication"/><xsl:text>
    </xsl:text></xsl:if>
    <xsl:if test="@sceneProfileLevelIndication"> sceneProfileLevelIndication  <xsl:value-of select="@sceneProfileLevelIndication"/><xsl:text>
    </xsl:text></xsl:if>
    <xsl:if test="@audioProfileLevelIndication"> audioProfileLevelIndication  <xsl:value-of select="@audioProfileLevelIndication"/><xsl:text>
    </xsl:text></xsl:if>
    <xsl:if test="@visualProfileLevelIndication"> visualProfileLevelIndication  <xsl:value-of select="@visualProfileLevelIndication"/><xsl:text>
    </xsl:text></xsl:if>
    <xsl:if test="@graphicsProfileLevelIndication"> graphicsProfileLevelIndication  <xsl:value-of select="@graphicsProfileLevelIndication"/><xsl:text>
    </xsl:text></xsl:if>
    <xsl:if test="@includeInlineProfileLevelFlag"> includeInlineProfileLevelFlag  <xsl:value-of select="@includeInlineProfileLevelFlag"/><xsl:text>
    </xsl:text></xsl:if>
</xsl:template>
```

The Descr template calls a predetermined esDescr template when esDescr is found by the parsing, and calls a predetermined ipmpDescr template when ipmpDescrPtr is found by the parsing.

```
<xsl:template match="xmt:Descr">
    <xsl:apply-templates select="xmt:esDescr |xmt:ociDescr
    |xmt:ipmpDescrPtr"/>
</xsl:template>
```

The esDescr template calls a predetermined ES_Descriptor template when esDescr and then ES_Descriptor are found by the parsing.

```
<xsl:template match="xmt:esDescr">
<      xsl:apply-templates select="xmt:ES_Descriptor"/>
</xsl:template>
<xsl:template match="xmt:ociDescr">
<  xsl:apply-templates select="xmt:ContentClassificationDescriptor|xmt:KeyWordDescriptor
|xmt:RatingDescriptor|xmt:LanguageDescriptor|xmt:ShortTextualDescriptor|xmt:ExpandedTextualDescriptor
|xmt:ContentCreatorNameDescriptor|xmt:ContentCreationDateDescriptor|xmt:OCICreatorNameDescriptor
|xmt:OCICreationDateDescriptor|xmt:SMPTECameraPositionDescriptor"/>
</xsl:template>
```

The ipmpDescrPtr template calls a predetermined IPMP-Descriptor template when ipmpDescrPtr and then IPMP_Descriptor are found by the parsing, and calls a predetermined IPMP_DescriptorPointer template when IPMP_DescriptorPointer is found by the parsing.

```
<xsl:template match="xmt:ipmpDescrPtr">
    <xsl:apply-templates select="xmt:IPMP_Descriptor
    |xmt:IPMP_DescriptorPointer"/>
</xsl:template>
```

The ES_Descriptor template calls a predetermined URL when ES_Descriptor and then URL are found by the parsing, calls a predetermined StreamSourcer template when StreamSourcer is found by the parsing, calls a predetermined decConfigDescr template when decConfigDescr is found by the parsing, calls a predetermined slConfigDescr template when slConfigDescr is found by the parsing, calls a predetermined ipiPtr template when ipiPtr is found by the parsing, calls a predetermined ipIDs template when ipIDs is found by the parsing, calls a predetermined ipmpDescrPtr template when ipmpDescrPtr is found by the parsing, calls a predetermined langDescr template when langDescr is found by the parsing, calls a predetermined redact template when regDescr is found by the parsing, and calls a predetermined qosDescr template when qosDescr is found by the parsing. The decConfigDescr template includes DecoderConfigDescriptor.

```
<xsl:template match="xmt:ES_Descriptor">
    <xsl:if test="@ES_ID"></xsl:if>
    <xsl:if test="@streamPriority"></xsl:if>
    <xsl:if test="@OCR_ES_ID"></xsl:if>
    <xsl:if test="@dependsOn_ES_ID"></xsl:if>
    <xsl:apply-templates select="xmt:URL"/>
    <xsl:apply-templates select="xmt:StreamSource |xmt:decConfigDescr
    |xmt:slConfigDescr |xmt:ipiPtr |xmt:ipIDs |xmt:ipmpDescrPtr
    |xmt:langDescr |xmt:regDescr |xmt:qosDescr"/>
```

```
</xsl:template>
<xsl:template match="xmt:decConfigDescr"></xsl:template>
<xsl:template match="xmt:slConfigDescr"></xsl:template>
<xsl:template match="xmt:ipiPtr"></xsl:template>
<xsl:template match="xmt:ipIDs"></xsl:template>
<xsl:template match="xmt:ipmpDescrPtr"></xsl:template>
<xsl:template match="xmt:langDescr"></xsl:template>
<xsl:template match="xmt:regDescr"></xsl:template>
<xsl:template match="xmt:qosDescr"></xsl:template>
```

To obtain a scene file that is compatible with the IM1 textual format, streamSource in XMT2MUX style sheet is required.

The XMT2BIFS style sheet calls a StreamSource1 template when StreamSource is found in the XMT file. The StreamSource1 template outputs muxSrcipt, a file name, and an extension of the mux file to the scene file when CompressedImageFormat is found by the parsing, and outputs muxScript, a file name, and an extension of the mux file to the scene file when BitWrapperEncodingHints is found by the parsing.

```
<xsl:template match="xmt:StreamSource">
        <xsl:call-template name="StreamSource1"></xsl:call-template>
</xsl:template>
<xsl:template name="StreamSource1">
        <xsl:param name="first" select="substring-before(@url, '.')"/>
        <xsl:if test="@url">
            <xsl:choose>
                    <xsl:when test="contains(@url, '.od')">
<!--muxScript <xsl:value-of select="$first"/>.mux -->
                    </xsl:when>
                    <xsl:when test="contains(@url, '.bif')">
<!--muxScript <xsl:value-of select="$first"/>.mux -->
                    </xsl:when>
                            <xsl:otherwise></xsl:otherwise>
            </xsl:choose>
        </xsl:if>
        <xsl:if  test="xmt:CompressedImageFormat">muxScript
        <xsl:value-of  select="$first"/>.mux
</xsl:if>
        <xsl:if  test="xmt:BitWrapperEncodingHints">muxScript
        <xsl:value-of  select="$first"/>.mux
</xsl:if>
        </xsl:template>
```

An XMT2MUX style sheet according to the present invention will be described. To convert an input XMT, which is parsed with reference to Odids in the schema, into a mux file that is compatible with the IM1 textual format, the followings are defined. Conventionally, when ObjectDescriptor or InitialObjectDescriptor is found, a value of objectDescriptorID can be used for Odids. However, an output file that is compatible with the IM1 textual format cannot be obtained. However, an output file that is compatible with the IM1 textual format can be obtained by changing ObjectDescriptorUpdate instead of ObjectDescriptor. In other words, the XMT2MUX style sheet defines a template name as ODids and objectDescriptorID as a value for the ODids and calls a ObjectDescriptorUpdate template or an InitialObjectDescriptor template.

```
<xsl:key name="ODids" match="xmt:ObjectDescriptorUpdate
|xmt:InitialObjectDescriptor" use="@objectDescriptorID" />
```

The XMT2MUX style sheet should include parts defining information necessary in the input XMT file. Only header information is originally allowed to be used. However, to obtain an output format in IM1 textual format according to the XMT standard specification, body information is also required. Accordingly, in order to use the body information, it is defined. The XMT2MUX style sheet calls a lower template of Body when/and then Body/* are found by the parsing and calls a lower template of Header when Header/* is found by the parsing.

```
<xsl:template match="/">
    <xsl:apply-templates select="xmt:XMT-A/xmt:Header/*"/>
    <xsl:apply-templates select="xmt:XMT-A/xmt:Body/*"/>
</xsl:template>
```

To convert an input XMT file to a MUX file that is compatible with the IM1 textual format by parsing the XMT file input to the XMT2MUX style sheet with reference a schema, an ObjectDescriptorUpdate template is defined as follows.

The ObjectDescriptorUpdate template calls an OD template when ObjectDescriptorUpdate is found in the XMT by parsing. The OD template calls an ObjectDescriptor template when OD is found in the OD template.

```
<xsl:template match="xmt:ObjectDescriptorUpdate">
    <xsl:apply-templates select="xmt:OD"/>
</xsl:template>
<xsl:template match="xmt:OD">
    <xsl:apply-templates select="xmt:ObjectDescriptor"/>
</xsl:template>
```

Conventionally, DecConfigDescr and slConfigDescr cannot be used to output a mux file that is compatible with the IM1 textual format. However, according to embodiments of the present invention, a mux file that is compatible with the IM1 textual format can be obtained using DecConfigDescr and slConfigDescr.

The ES_Descriptor template includes decConfigDescr, slConfigDescr, and StreamSource and can call a decConfigDescr template, a slConfigDescr template, and a StreamSource template when decConfigDescr, slConfigDescr, and StreamSource are found, respectively.

The decConfigDescr template outputs 'decConfigDescr DecoderConfigDescriptor {' to the mux file when decConfigDescr is found by the parsing, calls a DecoderConfigDescriptor template, and outputs} to the mux file.

The slConfigDescr template outputs slConfigDescr SLConfigDescriptor { to the mux file when slConfigDescr is found, calls an SLConfigDescriptor template, and outputs} to the mux file.

The XMT2MUX style sheet may further includes a decoding information stylesheet including an AFXConfig template and a DecoderConfigDescriptor template.

The DecoderConfigDescriptor template defines an element name as SFXconfig in a decSpecificInfo node in a DecoderConfigDescriptor node including information required for decoding and calls an AFXConfig template when decSpecificInfo and then AFXConfig are found by the parsing.

```
<xsl:template match="xmt:decConfigDescr">
    decConfigDescr DecoderConfigDescriptor {
    <xsl:apply-templates select="xmt:DecoderConfigDescriptor"/>
    }
</xsl:template>
<xsl:template match="xmt:slConfigDescr">
    slConfigDescr SLConfigDescriptor {
    <xsl:apply-templates select="xmt:SLConfigDescriptor"/>
    }
</xsl:template>
```

A style sheet for DecoderConfigDescriptor is defined as follows.

```
<xsl:template match="xmt:DecoderConfigDescriptor">
    <xsl:if test="@streamType">  streamType  <xsl:value-of select="@streamType"/><xsl:text>
    </xsl:text></xsl:if>
    <xsl:if test="@objectTypeIndication">  objecTypeIndication  <xsl:value-of select="@objectTypeIndication"/><xsl:text>
    </xsl:text></xsl:if>
    <xsl:if test="@upStream">  upStream  <xsl:value-of select="@upStream"/><xsl:text>
    </xsl:text></xsl:if>
    <xsl:if test="@bufferSizeDB">  bufferSizeDB  <xsl:value-of select="@bufferSizeDB"/><xsl:text>
    </xsl:text></xsl:if>
    <xsl:if test="@maxBitrate">  maxBitrate  <xsl:value-of select="@maxBitrate"/><xsl:text>
    </xsl:text></xsl:if>
    <xsl:if test="@avgBitrate">  avgBitrate  <xsl:value-of select="@avgBitrate"/><xsl:text>
    </xsl:text></xsl:if>
    <xsl:apply-templates select="xmt:decSpecificInfo |xmt:profileLevelIndicationIndexDescr"/>
</xsl:template>
```

AFXConfig is defined to output a mux file that is compatible with the IM1 textual format.

```
<xsl:template    match="xmt:decSpecificInfo"><xsl:apply-
templates    select=
"xmt:BIFSConfig|xmt:BIFSv2Config|xmt:DecoderSpecificInfo|xmt:
AFXConfig"/>
    </xsl:template>
```

Param is defined that is compatible to The IM1 textual format.

```
<xsl:value-of select="@name"/><xsl:text>
"</xsl:text><xsl:value-of select="@value"/>"<xsl:text>
</xsl:text>
    </xsl:template>
```

To decode a compressed bitstream using a decoder, an AFXConfig template related to information on the decoder is required. A mux file that is compatible to the IM1 textual format can be output using the AFXConfig template.

The AFXConfig template outputs 'decSpecificinfo AFXConfig{' to the mux file when AFXConfig is found, calls an OctreeImageDecoderSpecific template when OctreeImageDecoderSpecific is found by the parsing, calls a PointTextureCompDecoderSpecific template when PointTextureCompDecoderSpecific is found by the parsing, and outputs} to the mux file.

```
<xsl:template match="xmt:AFXConfig"> decSpecificInfo AFXConfig {
    afxext <xsl:apply-templates select="xmt:A3DMCDecoderSpecific
|xmt:CoordInterpCompDecoderSpecific|xmt:PosInterpCompDecoderSpecific
|xmt:OriInterpCompDecoderSpecific
|xmt:MeshGridDecoderSpecific|xmt:WMDecoderSpecific|xmt:OctreeImageDecoderSpecific
|xmt:BBADecoderSpecific|xmt:PointTextureCompDecoderSpecific"/>
        }
</xsl:template>
<xsl:template match="xmt:A3DMCDecoderSpecific"> A3DMCDecoderSpecific { }
</xsl:template>
<xsl:template match="xmt:CoordInterpCompDecoderSpecific"> CoordInterpCompDecoderSpecific { }
</xsl:template>
<xsl:template match="xmt:PosInterpCompDecoderSpecific"> PosInterpCompDecoderSpecific { }
</xsl:template>
<xsl:template match="xmt:OriInterpCompDecoderSpecific"> OriInterpCompDecoderSpecific { }
</xsl:template>
```

The OctreeImageDecoderSpecific template outputs 'OctreeImageDecoderSpecific{ }' to the mux file when OctreeImageDecoderSpecific is found.

```
<xsl:template match="xmt:OctreeImageDecoderSpecific">
    OctreeImageDecoderSpecific{ }
    </xsl:template>
```

The PointTextureCompDecoderSpecific template outputs 'PointTextureCompDecoderSpecific{ }' to the mux file when PointTextureCompDecoderSpecific is found.

```
<xsl:template match="xmt:PointTextureCompDecoderSpecific">
    PointTextureCompDecoderSpecific { }
    </xsl:template>
```

To obtain an mux file that is compatible with the IM1 textual format, BitWrapperEncodingHints and CompressedImageFormat for the OctreeImage and PointTexture should be in Muxinfo of streamSource.

Thus, BitWrapperEncodingHints and CompressedImageFormat for the OctreeImage and the PointTexture should be declared, in order to be used in StreamSource.

The XMT2MUX style sheet calls a StreamSource template when StreamSource is found in the XMT file. The StreamSource template outputs 'muxInfo MuxInfo { fileName', outputs a value of 'url' to the mux when 'url' is found, and calls a corresponding one of an EncodingHints template, a BIFSEncodingHints template, a FBAEncodingHints template, a BitWrapperEncodingHints template, and a CompressedImageFormat template when 'url' is not found and one of EncodingHints, BIFSEncodingHints, FBAEncodingHints, BitWrapperEncodingHints, and CompressedImageFormat is found by the parsing. When the template that is called is not the EncodingHints template, the BitWrapperEncodingHints template, and CompressedImageFormat template, the XMT2MUX style sheet outputs streamFormat BIFS and outputs} to the mux file when} is found by the parsing. An example of a style sheet for the StreamSource template is as follows.

```
xsl:template match="xmt:StreamSource">    muxInfo MuxInfo {
    fileName <xsl:value-of select="@url"/><xsl:text>
        </xsl:text>
<!-- what to do for urls? -->
<xsl:apply-templates select=
"xmt:EncodingHints|xmt:BIFSEncodingHints|xmt:FBAEncodingHints|
```

-continued

```
xmt:BitWrapperEncodingHints|xmt:
CompressedImageFormat"/>
<xsl:if test=
"not(xmt:EncodingHints|xmt:BitWrapperEncodingHints|
xmt:CompressedImageFormat)">streamFormat
BIFS<xsl:text>
</xsl:text></xsl:if>
<xsl:if test="xmt:BitWrapperEncodingHints"><xsl:text>
</xsl:text></xsl:if>
<xsl:apply-templates select=
"xmt:BitWrapper3DMCEncodingHints|xmt:BitWrapperICEncodingHints|
xmt:BitWrapperOctreeImageEncodingHints|xmt:OthersEncodingHints|
xmt:BitWrapperPointTextureEncodingHints|
xmt:BitWrapperMeshGridEncodingHints|
xmt:BitWrapperWaveletSubdivisionSurfaceEncodingHints"/>
<xsl:if test="xmt:CompressedImageFormat"></xsl:if>
<xsl:apply-templates
select="xmt:JPEG|xmt:PNG|xmt:MPEG4-Video|xmt:VTC"/>    }
    </xsl:template>
```

A conventional BitWrapperEncodingHints includes encodinghints related to, for example, 3DMC, Interpolator-Compression, etc., but not encodinghints related to Octree-Image and PointTexture, so that a compressed image file included in a DIBR node cannot be transmitted and reproduced. Accordingly, a mux file that is compatible with the IM1 textual format cannot be output. However, in embodiments of the present invention, BitWrapperOctreeImageEncodingHints and BitWrapperPointTextureEncodingHints are incorporated into BitWrapperEncodingHints, and CompressedImageFormat, which enables transmission of a name of a compressed image file (not compressed by BitWrapper) included in a DIBR node and a format of the file and reproduction of the file, is defined, so that a file that is compatible with the IM1 textual format can be output.

The BitWrapperEncodingHints template calls a BitWrapperOctreeImageEncodingHints template when BitWrapperEncodingHints and then BitWrapperOctreeImageEncodingHints are found by the parsing, and calls a BitWrapperPointTextureEncodingHints template when BitWrapperPointTextureEncodingHints is found by the parsing.

The BitWrapperOctreeImageEncodingHints template calls a sourceFormat template when BitWrapperOctreeImageEncodingHints and then sourceFormat are found by the parsing, calls a targetFormat template when targetFormat is found by the parsing, and outputs streamFormatOctreeImageCompression to the mux file.

The BitWrapperPointTextureEncodingHints template calls a sourceFormat template when BitWrapperPointTextureEncodingHints and then sourceFormat are found by the parsing, calls a targetFormat template when targetFormat is found by the parsing, and outputs streamFormatPointTextureCompression to the mux file.

The sourceFormat template and the targetFormat template call a param template when param is found by the parsing, and the param template outputs A value of the file name.

```
<xsl:template match="xmt:BitWrapperEncodingHints">
<xsl:apply-templates select="xmt:BitWrapper3DMCEncodingHints
|xmt:BitWrapperICEncodingHints|xmt:BitWrapperOctreeImageEncodingHints
|xmt:OthersEncodingHints|xmt:BitWrapperPointTextureEncodingHints
|xmt:BitWrapperMeshGridEncodingHints
|xmt:BitWrapperWaveletSubdivisionSurfaceEncodingHints"/>
<xsl:apply-templates select="xmt:sourceFormat|xmt:targetFormat"/>
</xsl:template>
<xsl:template match="xmt:BitWrapper3DMCEncodingHints">
<xsl:apply-templates select="xmt:sourceFormat|xmt:targetFormat"/>
stream Format 3DMC
</xsl:template>
<xsl:template match="xmt:BitWrapperICEncodingHints">
<xsl:apply-templates select="xmt:sourceFormat|xmt:targetFormat"/>
stream Format InterpolatorCompression
</xsl:template>
<!-- add BitWrapperDIBREncodingHints in the BitWrapperEncodingHints for DIBR Nodes -->
<xsl:template match="xmt:BitWrapperOctreeImageEncodingHints">
<xsl:apply-templates select="xmt:sourceFormat|xmt:targetFormat"/>
streamFormat OctreeImageCompression
</xsl:template>
<xsl:template match="xmt:BitWrapperPointTextureEncodingHints">
<xsl:apply-templates select="xmt:sourceFormat|xmt:targetFormat"/>
streamFormat PointTextureCompression
</xsl:template>
<xsl:template match="xmt:OthersEncodingHints">
<xsl:apply-templates select="xmt:sourceFormat|xmt:targetFormat"/>
</xsl:template>
```

The XMT2MUX style sheet calls a corresponding one of a JPEG template, a PNG template, an MPEG4-Video template, and a VTC template when CompressedImageFormat and then JPEG, PNG, MPEG4-Video, or VTC are found by the parsing. When the JPEG template is called, the JPEG template calls a sourceFormat template or a targetFormat template and outputs streamFormat JPEG. When the PNG template is called, the PNG template calls a sourceFormat template or a targetFormat template and outputs streamFormat PNG. When the MPEG4-Video template is called, the MPEG4-vide template calls a sourceFormat template or a targetFormat template and outputs streamFormat MPEG4-Video. When the VTC template is called, the VTC template calls a sourceFormat template or a targetFormat template and outputs streamFormat VTC.

The sourceFormat template and the targetFormat template call a param template, and the param template output a value of the file name.

```
<!-- CompressedImageFormat : JPEG, PNG, MPEG4-Video, VTC for DIBR Nodes -->
<xsl:template match="xmt:CompressedImageFormat">
```

-continued

```
<xsl:apply-templates select="xmt:JPEG|xmt:PNG|xmt:MPEG4-Video|xmt:VTC"/>
<xsl:apply-templates select="xmt:sourceFormat|xmt:targetFormat"/>
</xsl:template>
<xsl:template match="xmt:JPEG">
<xsl:apply-templates select="xmt:sourceFormat|xmt:targetFormat"/>     stream Format JPEG
</xsl:template>
<xsl:template match="xmt:PNG">
<xsl:apply-templates select="xmt:sourceFormat|xmt:targetFormat"/>     stream Format PNG
</xsl:template>
<xsl:template match="xmt:MPEG4-Video">
<xsl:apply-templates select="xmt:sourceFormat|xmt:targetFormat"/>     stream Format
MPEG4-Video
</xsl:template>
<xsl:template match="xmt:VTC">
<xsl:apply-templates select="xmt:sourceFormat|xmt:targetFormat"/>
stream Format VTC
    </xsl:template>
<xsl:template match="xmt:sourceFormat">
<xsl:apply-templates select="xmt:param"/>
</xsl:template>
<xsl:template match="xmt:targetFormat">
<xsl:apply-templates select="xmt:param"/>
</xsl:template>
<xsl:template match="xmt:param">
<xsl:value-of select="@name"/><xsl:text> "</xsl:text><xsl:value-of select="@value"/>"<xsl:text>
</xsl:text>
</xsl:template>
```

The present invention may be recorded in a computer readable medium. The present invention may be implemented as a computer (including any information processing apparatus) readable program code. Examples of the computer readable medium include any kinds of recording apparatuses storing computer readable data, for example, ROMs, RAMs, CD-ROMs, magnetic tapes, floppy disks, and optically readable media.

A schema and style sheets for DIBR data according to the present invention allows an author to easily control the representation and compression of DIBR when authoring 3D contents and to easily generate an input file for an MPEG-4 encoder. Since the author can personally compress 3D graphics data when authoring contents, real-time visualization and real-time animation of DIBR data can be implemented even in a narrow bandwidth network.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A computer readable recording medium having encoded thereon an XMT (extensible MPEG-4 textual format) schema for DIBR data, the XMT schema comprising:
a BitWrapper node schema used for graphics data compression; and
a DepthImage node schema, which is used for depthimage-based model rendering, includes camera information and texture information having a depth information, defines diTexture as an element including SFDepthTextureNode as a model group,
wherein the BitWrapper node schema comprises:
a node element, which contains graphics data including data to be compressed and refers to SFWorldNode as a subelement;
a BitWrapperEncodingParameter element; and
three attributes having the names type, url, and buffer and the types SFInt32, MFUrl, and SFString, respectively, and the camera information of the depthimage node schema defines at least one of position, orientation, fieldOfView, nearPlane, farPlane, and orthographic as an attribute name, and attribute types defined in the camera information include SFVec3f, SFRotation, SFVec2f, SFFloat, SFFloat, and SFBool, respectively.

2. The computer readable medium of claim 1, wherein the diTexture element in the depthimage node schema defines an SFDepthTextureNode node schema including PointTexture and SimpleTexture as elements.

3. The computer readable medium of claim 2, wherein a node schema for the SimpleTexture receives the depth image and a color image used for 3-dimensional rendering of a DIBR model, includes a depth element including depth information as an image and a texture element including color information as an image, wherein the two images are defined in an SFTextureNodeType element.

4. The computer readable medium of claim 2, wherein a node schema for the PointTexture defines at least one of width, height, depthNbBits, depth, and color as an attribute name, and attribute types defined in the node schema include SFInt32, SFInt32, SFInt32, MFInt32, and MFColor.

5. The computer readable medium of claim 2, wherein the XMT schema further comprises an octreeimage node schema, which defines at least one of octree, octreeResolution, and voxelImageIndex as an attribute name and defines images as an element including SFDepthImageNodeType as a node group, wherein attribute types defined in the octreeimage node schema include SFInt32, MFInt32, and MFInt32, respectively.

6. The computer readable medium of claim 1, wherein the XMT schema further comprises a decoding information schema including an AFXConfig schema and a DecoderConfigDescriptor schema when the BitWrapper node schema is an out-band using a url field,
wherein the DecoderConfigDescriptor schema defines an element name as AFXconfig in a decSpecificInfo node in a DecoderConfigDescriptor node including information required for decoding, and the AFXConfig schema defines OctreeImageDecoderSpecific information related to use of an octree image decoder for decoding and PointTextureCompDecoderSpecific information related to use of a point texture decoder for decoding as element names.

7. The computer readable medium of claim 6, wherein the XMT schema further comprises a compression parameter schema including a compression rate for point texture, wherein the compression parameter schema is included in a node including BitWrapperEncodingParameter as an element name, includes PointTextureEncodingParameter as an element name, configPercent as an attribute name, and codingPercentType as an attribute type, wherein the codingPercentType has SimpleType as a type and codingPercentType as a name.

8. The computer readable medium of claim 7, wherein the codingPercentType has int (integer) as a restriction base.

9. The computer readable medium of claim 6, wherein the decoding information schema further comprises BitWrapperEncodingHints used to define information required for Muxinfo in a script file (mux file), wherein the BitWrapperEncodingHints includes BitWrapperOctreeImageEncodingHints and BitWrapperPointTextureEncodingHints as subelements, and each of the subelements includes at least one of sourceFormat and targetFormat as a subelement.

10. The computer readable medium of claim 9, wherein the information required for the Muxinfo in the script file (mux file) includes a file name and a compression format of a compressed DIBR bitstream.

11. The computer readable medium of claim 2, wherein the XMT schema further comprises a CompressedImageFormat schema,
wherein, when a DIBR-related node includes a compressed image or a moving picture in the format of JPEG, PNG, MPEG4-Video, or VTC, the CompressedImageFormat schema provides decoding information, which includes a file name and a compression format of a compressed bitstream, required for decoding of compressed information, and the CompressedImageFormat schema includes CompressedImageFormat as an element name and JPEG, PNG, MPEG4-Video, and VTC as subelement names, wherein each of the subelement includes sourceFormat or targetFormat that include param for storing a file name.

12. A computer readable recording medium having encoded thereon an XMT style sheet for parsing an input XMT (extensible MPEG-4 textual format) file including depth image-based representation (DIBR) data using a schema of claim 1 for the DIBR data, the XMT style sheet comprising:
an XMT2BIFS style sheet used to generate a scene file for the DIBR data; and
an XMT2MUX style sheet used to generate an mux file for the DIBR data.

13. The computer readable medium of claim 12, wherein the XMT2BIFS style sheet outputs 'BitWrapper {' to a scene file when a statement of calling a BitWrapper template is executed and BitWrapper is found in the XMT file by the parsing, calls a predetermined node template when node is found by the parsing, calls a predetermined PointTextureEncodingParameter template when PointTextureEncodingParameter, which is one of DIBR encoding parameters for a node to be compressed, is found by the parsing, outputs type, buffer, and type and values thereof to the scene file when type, buffer, and url are found by the parsing; and outputs } to the scene file.

14. The computer readable medium of claim 13, wherein the predetermined node template outputs node to the screen file when node is found by the parsing, calls a predetermined PointTexture template when PointTexture is found by the parsing, and calls a predetermined OctreeImage template when Octreeimage is found by the parsing.

15. The computer readable medium of claim 14, wherein the predetermined PointTexture template outputs 'PointTexture {' to the scene file when PointTexture is found by the parsing, outputs width, height, depthNbBits, depth[ ], and color[ ]and values thereof to the scene file when width, height, depthNbBits, depth, and color are found by the parsing, and outputs } to the scene file.

16. The computer readable medium of claim 12, wherein the XMT style sheet further comprises a simpleTexture template, which outputs 'SimpleTexture {' to the scene file when SimpleTexture is found by the parsing, calls a predetermined depth template when depth is found by the parsing, calls a predetermined texture template when texture is found by the parsing, and outputs } to the scene file.

17. The computer readable medium of claim 16, wherein the predetermined depth template outputs depth to the scene file when depth is found by the parsing, calls a predetermined CompositeTexture2D template when CompositeTexture2D is found by the parsing, calls a predetermined CompositTexutre3D template when CompositTexutre3D is found by the parsing, calls a predetermined ImageTexture template when ImageTexture is found by the parsing, calls a predetermined MovieTexture template when MovieTexture is found by the parsing, calls a predetermined PixelTexture template when PixelTexture is found by the parsing, and calls a predetermined ProtoInstance template when ProtoInstance is found by the parsing.

18. The computer readable medium of claim 12, wherein the XMT style sheet further comprises a DepthImage template, which outputs 'DepthImage {' to the scene when DepthImage is found by the parsing, outputs diTexture to the scene file when diTexture is found by the parsing and calls a predetermined diTexture template, outputs fieldOfView, nearPlane, farPlane, orientation, position, and orthographic, and values thereof to the scene file when fieldOfView, nearPlane, farPlane, orientation, position, and orthographic are found by the parsing.

19. The computer readable medium of claim 12, wherein the XMT style sheet further comprises a diTexture template, which calls a predetermined SimpleTexture template when Simple Texture is found by the parsing after diTexture has been found, and calls a predetermined PointTexture when PointTexture is found by the parsing.

20. The computer readable medium of claim 14, wherein the predetermined OctreeImage template outputs 'OctreeImage {' to the scene file when OctreeImage is found by the parsing, outputs octreeResolution, octree[ ], and voxelImageIndex[ ], and values thereof to the scene file when octreeResolution, octree, and voxelImageIndex are found by the parsing, outputs images[ ]to the scene file when images are found by the parsing and calls a predetermined images template, and output } to the scene file.

21. The computer readable medium of claim 20, wherein the predetermined images template calls a predetermined DepthImage template when images is found by the parsing.

22. The computer readable medium of claim 13, wherein the PointTextureEncodingParameter template outputs 'PointTextureEncodingParameter {' to the scene file when PointTextureEncodingParameter is found by the parsing, outputs condingPercent and a value thereof to the senefile when codingPercent is found by the parsing, and output } to the scene file.

23. The computer readable medium of claim 12, wherein the XMT2BIFS style sheet calls a Body lower template when / and then Body/* are found in the XMT file by the parsing and calls a Header lower template when Header/* is found by the parsing.

24. The computer readable medium of claim 12, wherein the XMT2BIFS style sheet outputs UPDATE OD [to the scene file when ObjectDescnptorUpdate is found in the XMT by the parsing, calls a predetermined ObjectDescnptor template when OD and ObjectDescnptor are found by the parsing, calls a predetermined InitialObjectDescriptor template when InitialObjectDescriptor is found by the parsing, and outputs ] to the scene file.

25. The computer readable medium of claim 24, wherein the predetermined ObjectDescriptor template outputs ObjectDescriptor { to the scene file when ObjectDescriptor is found by the parsing, outputs objectDescriptorID to the scene file when an attribute name objectDescriptorID is found by parsing, outputs a value of an attribute name binaryID when the attribute name binaryID is found by the parsing, calls a predetermined Descr template when Descr is found by the parsing, and outputs } to the scene file.

26. The computer readable medium of claim 24, wherein the predetermined InitialObjectDescriptor template calls a predetermined Profiles template when InitialObjectDescriptor and Profiles are found by the parsing and calls a predetermined Descr template when Descr is found by the parsing.

27. The computer readable medium of claim 26, wherein the predetermined Descr template calls a predetermined esDescr template when Descr and esDescr are found by the parsing and call a predetermined ipmpDescr template when ipmpDescrPtr is found by the parsing.

28. The computer readable medium of claim 27, wherein the predetermined esDescr template calls a predetermined ES_Descriptor template when esDescr and ES_Descriptor are found by the parsing.

29. The computer readable medium of claim 27, wherein the predetermined ipmpDescrPtr template calls a predetermined IPMPDescriptor template when ipmpDescrPtr and IPMP_Descriptor are found by the parsing and calls a predetermined IPMP_DescriptorPointer template when IPMP_DescriptorPointer is found by the parsing.

30. The computer readable medium of claim 28, wherein the predetermined ES_Descriptor template calls a predetermined URL template when ES_Descriptor and URL are found by the parsing, calls a predetermined StreamSourcer template when StreamSourcer is found by the parsing, calls a predetermined decConfigDescr template when decConfigDescr is found by the parsing, calls a predetermined slConfigDescr template when slConfigDescr is found by the parsing, calls a predetermined ipiPtr template when ipiPtr is found by the parsing, calls a predetermined ipIDs template when ipIDs is found by the parsing, calls a predetermined ipmpDescrPtr template when ipmpDescrPtr is found by the parsing, calls a predetermined langDescr template when langDescr is found by the parsing, calls a predetermined regDescr template when regDescr is found by the parsing, and calls a predetermined qosDescr template when qosDescr is found by the parsing.

31. The computer readable medium of claim 12, wherein the XMT2BIFS style sheet calls a StreamSource1 template when StreamSource is found in the XMT file by the parsing, wherein the StreamSource1 template outputs muxSrcipt, a name of the file, and an extension of a mux file to the scene when CompressedImageeFormat is found by the parsing, and outputs muxScript, a name of the file, and an extension of a mux file to the scene file when BitWrapperEncodingHints is found by the parsing.

32. The computer readable medium of claim 12, wherein the XMT2MUX style sheet calls a Body lower template when / and then Body/* are found in the XMT file by the parsing, and calls a Header lower template when Header/* is found by the parsing.

33. The computer readable medium of claim 12, wherein the XMT2MUX style sheet uses ODids as a template name as and objectDescriptorID as a value of the template name when ObjectDescriptorUpdate or InitialObjectDescriptor is found in the XMT file by the parsing, and calls an ObjectDescriptorUpdate template or an InitialObjectDescriptor template.

34. The computer readable medium of claim 33, wherein the ObjectDescriptorUpdate template calls an OD template when ObjectDescriptorUpdate is found in the XMT file by the parsing, and the OD template calls an ObjectDescriptor template when OD is found in the OD template.

35. The computer readable medium of claim 12, wherein the XMT2MUX style sheet comprises a decConfigDescr template, which is called when decConfigDescr is found in a predetemirned upper template, and an slConfigDescr template, which is called when slConfigDescr is found in the predetermined upper template,
wherein the decConfigDescr template outputs decConfigDescr DecoderConfigDescriptor { to the mux file when decConfigDescr is found by the parsing, calls a DecoderConfigDescriptor template, and outputs } to the mux file, and
the slConfigDescr template outputs slConfigDescr SLConfigDescriptor { to the mux file when slConfigDescr is found by the parsing, calls an SLConfigoescriptor template, and outputs } to the mux file.

36. The computer readable medium of claim 12, wherein the XMT2MUX style sheet comprises decoding information style sheet including an AFXConfig template and a DecoderConfigDescriptor template,
wherein the DecoderConfigDescriptor template defines an element name as AFXconfig in a decSpecificInfo node in a DecoderConfigDescriptor node including information required for decoding, and calls the AFXConfig template when decSpecificInfo and AFXConfig are found by the parsing.

37. The computer readable medium of claim 36, wherein the AFXConfig template outputs decSpecificInfo AFXConfig { to the mux file when AFXConfig is found by the parsing, calls an OctreeImageDecoderSpecific template when OctreeImageDecoderSpecific is found by the parsing, calls a PointTextureCompDecoderSpecific template when PointTextureCompDecoderSpecific is found by the parsing, and outputs } to the mux file.

38. The computer readable medium of claim 37, wherein the OctreeImageDecoderSpecific template outputs OctreeImageDecoderSpecific { }to the mux file when OctreeImageDecoderSpecific is found by the parsing.

39. The computer readable medium of claim 37, wherein the PointTextureCompDecoderSpecific template outputs PointTextureCompDecoderSpecific { }to the mux file when PointTextureCompDecoderSpecific is found by the parsing.

40. The computer readable medium of claim 12, wherein the XMT2MUX style sheet outputs muxlnfo MuxInfo { filename when StreamSource is found in the XMT file by the parsing, outputs the value of url to the mux file when url is found by the parsing, calls a corresponding one of an EncodingHints template, a BIFSEncodingHints template, a FBAEncodingHints template, a BitWrapperEncodingHints template, and a CompressedImageFormat template when url is not found and one of EncodingHints, BIFSEncodingHints, FBAEncodingHints, BitWrapperEncodingHints, and CompressedImageFormat are found by the parsing, wherein the found one is not EncodingHints, BitWrapperEncodingHints, or CompressedImageFormat, streamFormat BIFS is output, and outputs } to the mux file when } is found by the parsing.

41. The computer readable medium of claim 40, wherein the CompressedImageFormat template calls a corresponding one of a JPEG template, a PNG template, an MPEG4-video template, and a VTC template when CompressedImageFormat and one of JPEG, PNG, MPEG4-Video, and VTC are found by the parsing.

42. The computer readable medium of claim 41, wherein the JPEG template calls a sourceFormat template or a targetFormat template and outputs streamFormat JPEG when the JPEG template is called and JPEG is found by the parsing, the PNG template calls a sourceFormat template or a targetFormat template and outputs streamFormat PNG when the PNG template is called and PNG is found by the parsing, the MPEG4-Video template calls a sourceFormat template or a targetFormat template and outputs streamFormat MPEG4-Video when the MPEG4-Video template is called and MEPG4-Video is found by the parsing, and VTC template calls a sourceFormat template or a targetFormat template is called and outputs streamFomiat VTC when the VTC template is called and VTC is found by the parsing, wherein the sourceFormat template and the targetFormat template call a param template, and the parm template outputs a value of the file name.

43. The computer readable medium of claim 40, wherein the BitWrapperEncodingHints template calls a BitWrapperOctreeImageEncodingHints template when BitWrapperEncoding Hints and BitWrapperOctreeImageEncodingHints are found by the parsing, and calls a BitWrapperPointTextureEncodingHints template when BitWrapperPointTextureEncodingHints is found by the parsing.

44. The computer readable medium of claim 43, wherein the BitWrapperOctreeImageEncodingHints template calls a sourceFormat template when BitWrapperOctreeImageEncodingHints and sourceFormat are found by the parsing, calls a targetFormat template when targetFormat is found by the parsing, and outputs streamFormatOctreeImageCompression to the mux file, and the BitWrapperPointTextureEncodingHints template calls a sourceFormat template when BitWrapperPointTextureEncodingHints and sourceFormat are found by the parsing, calls a targetFormat template when targetFormat is found by the parsing, and outputs streamFormatPointTextureCompression to the mux file.

45. The computer readable medium of claim 44, wherein the sourceFormat template and the targetFormat call a param template when param is found by the parsing, and the param template outputs a value of the file name.

* * * * *